(12) United States Patent
Hayashi et al.

(10) Patent No.: US 12,309,514 B2
(45) Date of Patent: May 20, 2025

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventors: Shuhei Hayashi, Kanagawa (JP); Kento Watanabe, Kanagawa (JP); Yusuke Onuki, Kanagawa (JP); Hajime Ikeda, Kanagawa (JP); Daisuke Kobayashi, Saitama (JP); Takenori Kobuse, Kanagawa (JP); Taro Takita, Kanagawa (JP); Naoki Ishikawa, Chiba (JP); Yusuke Yamashita, Kanagawa (JP); Takahiro Kamikura, Tokyo (JP); Shigeharu Aoki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 18/504,445

(22) Filed: Nov. 8, 2023

(65) Prior Publication Data
US 2024/0171874 A1    May 23, 2024

(30) Foreign Application Priority Data

Nov. 18, 2022    (JP) ................. 2022-184522

(51) Int. Cl.
*H04N 25/59*    (2023.01)
*H04N 25/78*    (2023.01)

(52) U.S. Cl.
CPC ............. *H04N 25/59* (2023.01); *H04N 25/78* (2023.01)

(58) Field of Classification Search
CPC ........ H04N 25/59; H04N 25/78; H04N 25/00; H04N 25/40; H04N 25/532; H04N 25/589; H04N 25/771
See application file for complete search history.

(56) References Cited

U.S. PATENT DOCUMENTS

| 8,115,848 | B2 | 2/2012 | Onuki |
| 8,427,564 | B2 | 4/2013 | Yamashita |
| 8,736,734 | B2 | 5/2014 | Onuki |
| 9,142,575 | B2 | 9/2015 | Kobayashi |
| 9,716,849 | B2 | 7/2017 | Kobayashi |
| 9,894,295 | B2 | 2/2018 | Kawabata |

(Continued)

*Primary Examiner* — Michael E Teitelbaum
(74) *Attorney, Agent, or Firm* — VENABLE LLP

(57) ABSTRACT

A photoelectric conversion device includes pixels each including a photoelectric conversion unit for generating charge by photoelectric conversion, first to fourth charge holding portions configured to be transferred charge from the photoelectric conversion unit, and an output unit for outputting a signal corresponding to charge transferred from one of the first to fourth charge holding portions, and a control circuit for controlling the plurality of pixels. The control circuit performs, during one frame, transferring charge in the photoelectric conversion unit to the first or second charge holding portion a plural times for each of the first and second charge holding portions in each of the pixels at the same time, and performs, during the one frame, reading out from each pixel a signal corresponding to charge in the third charge holding portion and a signal corresponding to charge in the fourth charge holding portion.

19 Claims, 14 Drawing Sheets

(56) References Cited

U.S. PATENT DOCUMENTS

| | | | |
|---|---|---|---|
| 9,900,539 | B2 | 2/2018 | Yamasaki |
| 10,009,560 | B2 | 6/2018 | Kobayashi |
| 10,021,321 | B2 | 7/2018 | Kawabata |
| 10,057,519 | B2 | 8/2018 | Kobayashi |
| 10,186,532 | B2 | 1/2019 | Kobayashi |
| 10,194,103 | B2 | 1/2019 | Saito |
| 10,205,894 | B2 | 2/2019 | Kawabata |
| 10,249,678 | B2 | 4/2019 | Ryoki |
| 10,263,028 | B2 | 4/2019 | Takami |
| 10,453,879 | B2 | 10/2019 | Ikeda |
| 10,462,400 | B2 | 10/2019 | Kobayashi |
| 10,483,307 | B2 | 11/2019 | Sekine |
| 10,498,979 | B2 | 12/2019 | Kobayashi |
| 10,504,949 | B2 | 12/2019 | Kobayashi |
| 10,535,688 | B2 | 1/2020 | Onuki |
| 10,536,653 | B2 | 1/2020 | Ikeda |
| 10,638,066 | B2 | 4/2020 | Kobayashi |
| 10,764,520 | B2 | 9/2020 | Onuki |
| 10,771,718 | B2 | 9/2020 | Kawabata |
| 10,805,563 | B2 | 10/2020 | Ikeda |
| 10,818,715 | B2 | 10/2020 | Iwata |
| 10,834,354 | B2 | 11/2020 | Kobayashi |
| 10,848,695 | B2 | 11/2020 | Miki |
| 10,863,101 | B2 | 12/2020 | Kobuse |
| 10,991,541 | B2 | 4/2021 | Ikeda |
| 11,019,291 | B2 | 5/2021 | Kobayashi |
| 11,056,519 | B2 | 7/2021 | Inui |
| 11,056,520 | B2 | 7/2021 | Onuki |
| 11,196,948 | B2 | 12/2021 | Ikeda |
| 11,271,022 | B2 | 3/2022 | Onuki |
| 11,394,908 | B2 | 7/2022 | Akiyama |
| 11,523,080 | B2 | 12/2022 | Kobayashi |
| 11,653,121 | B2 | 5/2023 | Itano |
| 11,671,729 | B2 | 6/2023 | Itano |
| 11,742,364 | B2 | 8/2023 | Inui |
| 11,743,618 | B2 | 8/2023 | Onuki |
| 2013/0135486 | A1* | 5/2013 | Wan ............ H04N 5/765 348/207.99 |
| 2018/0106613 | A1* | 4/2018 | Iwakura ............ H04N 13/144 |
| 2023/0079653 | A1 | 3/2023 | Kobayashi |
| 2023/0247322 | A1 | 8/2023 | Itano |
| 2023/0343798 | A1 | 10/2023 | Inui |
| 2023/0362517 | A1 | 11/2023 | Onuki |
| 2024/0015415 | A1 | 1/2024 | Hayashi |
| 2024/0114258 | A1* | 4/2024 | Mabuchi ............ H04N 25/771 |

* cited by examiner

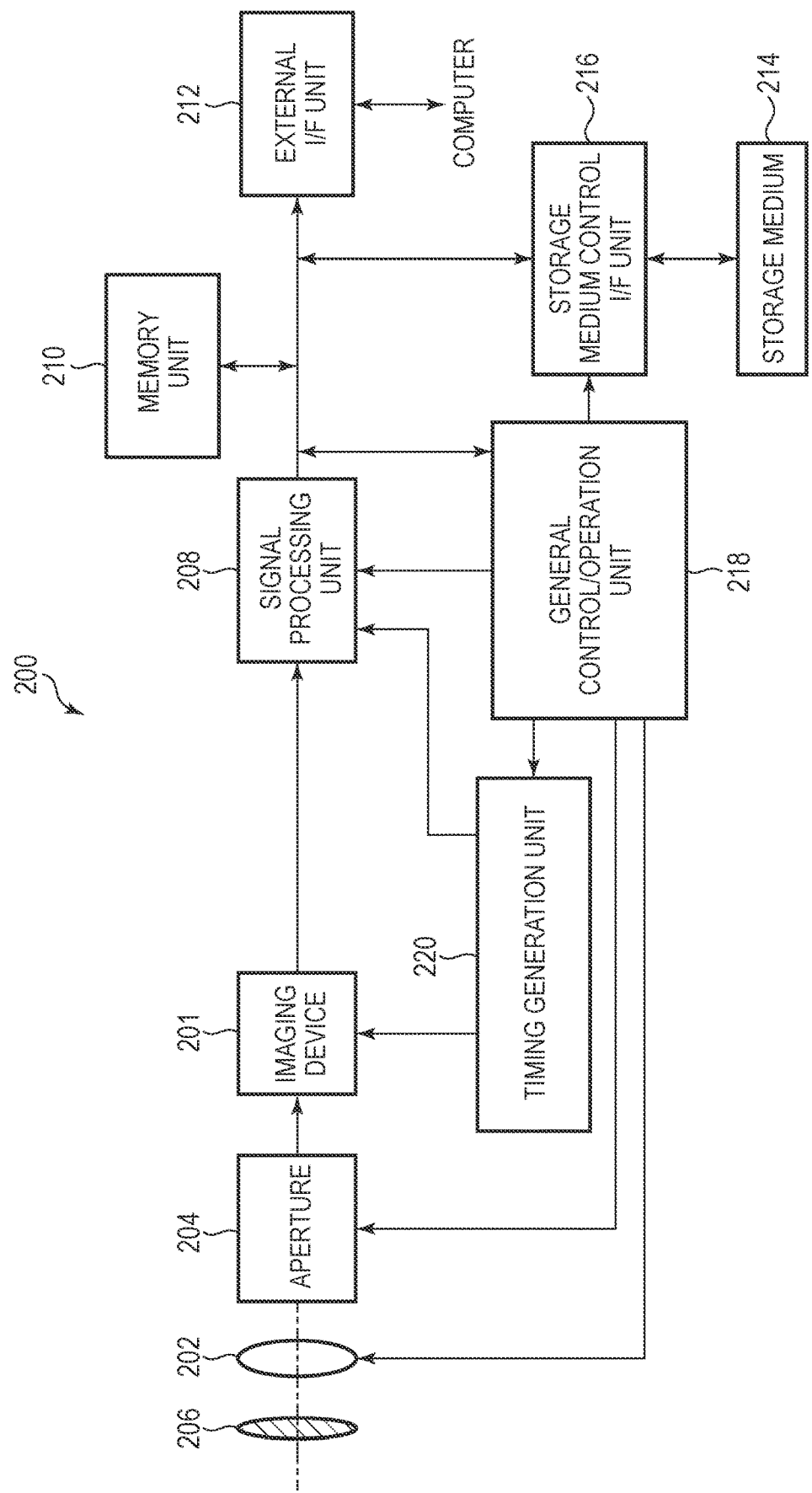

PHOTOELECTRIC CONVERSION DEVICE AND METHOD OF DRIVING PHOTOELECTRIC CONVERSION DEVICE

BACKGROUND OF THE INVENTION

Field of the Invention

The present invention relates to a photoelectric conversion device and a method of driving the photoelectric conversion device.

Description of the Related Art

As a photoelectric conversion device such as a CMOS image sensor, there has been proposed a photoelectric conversion device having a so-called global shutter function in which each pixel has a charge holding portion for temporarily holding signal charge, and charge transfer from a photoelectric conversion unit to the charge holding portion is performed all at once in all pixels. By using the global shutter function, the timing at which signals are accumulated in the photoelectric conversion unit may be aligned for all the pixels, and distortion of an object image in the case of photographing an object with high motion may be suppressed.

As another technique in the photoelectric conversion device, there has been proposed a technique of generating an image of a high dynamic range by compositing a plurality of image signals having different accumulation times of signal charge. For example, a plurality of charge holding portions are provided for one photoelectric conversion unit, and signal charges are accumulated in these charge holding portions at different accumulation times, whereby a plurality of image signals with different accumulation times of signal charge may be acquired. U.S. Patent Application Publication No. 2013/0135486 discloses a technique for generating an image of a high dynamic range by the method described above in a photoelectric conversion device having a global shutter function.

However, in the method described in U.S. Patent Application Publication No. 2013/0135486, the signal charge of the next frame cannot be stored in the charge holding portion while a signal based on the signal charge stored in the charge holding portion of each pixel is read out. Therefore, a period in which the signal charge cannot be accumulated between frames occurs, and a seamless moving image cannot be acquired in some cases.

SUMMARY OF THE INVENTION

An object of the present invention is to provide a photoelectric conversion device capable of obtaining a moving image of high quality and high dynamic range, and a method of driving the same.

According to an embodiment of the present disclosure, there is provided a photoelectric conversion device including a plurality of pixels each including a photoelectric conversion unit configured to generate charge by photoelectric conversion, a first charge holding portion, a second charge holding portion, a third charge holding portion, and a fourth charge holding portion each configured to be transferred charge from the photoelectric conversion unit, and an output unit configured to output a signal corresponding to an amount of charge transferred from the first charge holding portion, the second charge holding portion, the third charge holding portion, or the fourth charge holding portion, and a control circuit configured to control the plurality of pixels, wherein the control circuit is configured to perform, during one frame, a transfer operation of transferring charge accumulated in the photoelectric conversion unit to one of the first charge holding portion and the second charge holding portion a plurality of times for each of the first charge holding portion and the second charge holding portion in each of the plurality of pixels at the same time, and perform, during the one frame, a readout operation of reading out from each of the plurality of pixels a signal corresponding to an amount of charge held in the third charge holding portion and a signal corresponding to an amount of charge held in the fourth charge holding portion.

According to another embodiment of the present disclosure, there is provided a method of driving a photoelectric conversion device including a plurality of pixels each including a photoelectric conversion unit configured to generate charge by photoelectric conversion, a first charge holding portion, a second charge holding portion, a third charge holding portion, and a fourth charge holding portion each configured to be transferred charge from the photoelectric conversion unit, and an output unit configured to output a signal corresponding to an amount of charge to be transferred from the first charge holding portion, the second charge holding portion, the third charge holding portion, or the fourth charge holding portion, the method including performing, during one frame, a transfer operation of transferring charge accumulated in the photoelectric conversion unit to one of the first charge holding portion and the second charge holding portion a plurality of times for each of the first charge holding portion and the second charge holding portion in each of the plurality of pixels at the same time, and performing, during the one frame, a readout operation of reading out from each of the plurality of pixels a signal corresponding to an amount of charge held in the third charge holding portion and a signal corresponding to an amount of charge held in the fourth charge holding portion.

Further features of the present invention will become apparent from the following description of exemplary embodiments with reference to the attached drawings.

BRIEF DESCRIPTION OF THE DRAWINGS

FIG. 12 is a block diagram illustrating a schematic configuration of an imaging system according to a sixth embodiment of the present invention.

DESCRIPTION OF THE EMBODIMENTS

Preferred embodiments of the present invention will now be described in detail in accordance with the accompanying drawings. In the embodiments described below, an imaging device will be described as an example of a photoelectric conversion device. However, the embodiments are not limited to the imaging device and may be applied to other examples of a photoelectric conversion device. Examples include a ranging device (a device such as a focus detection device or a distance measurement device using TOF (time of flight), and a photometric apparatus (a device such as a measurement device of incident light quantity).

First Embodiment

Figure 1:
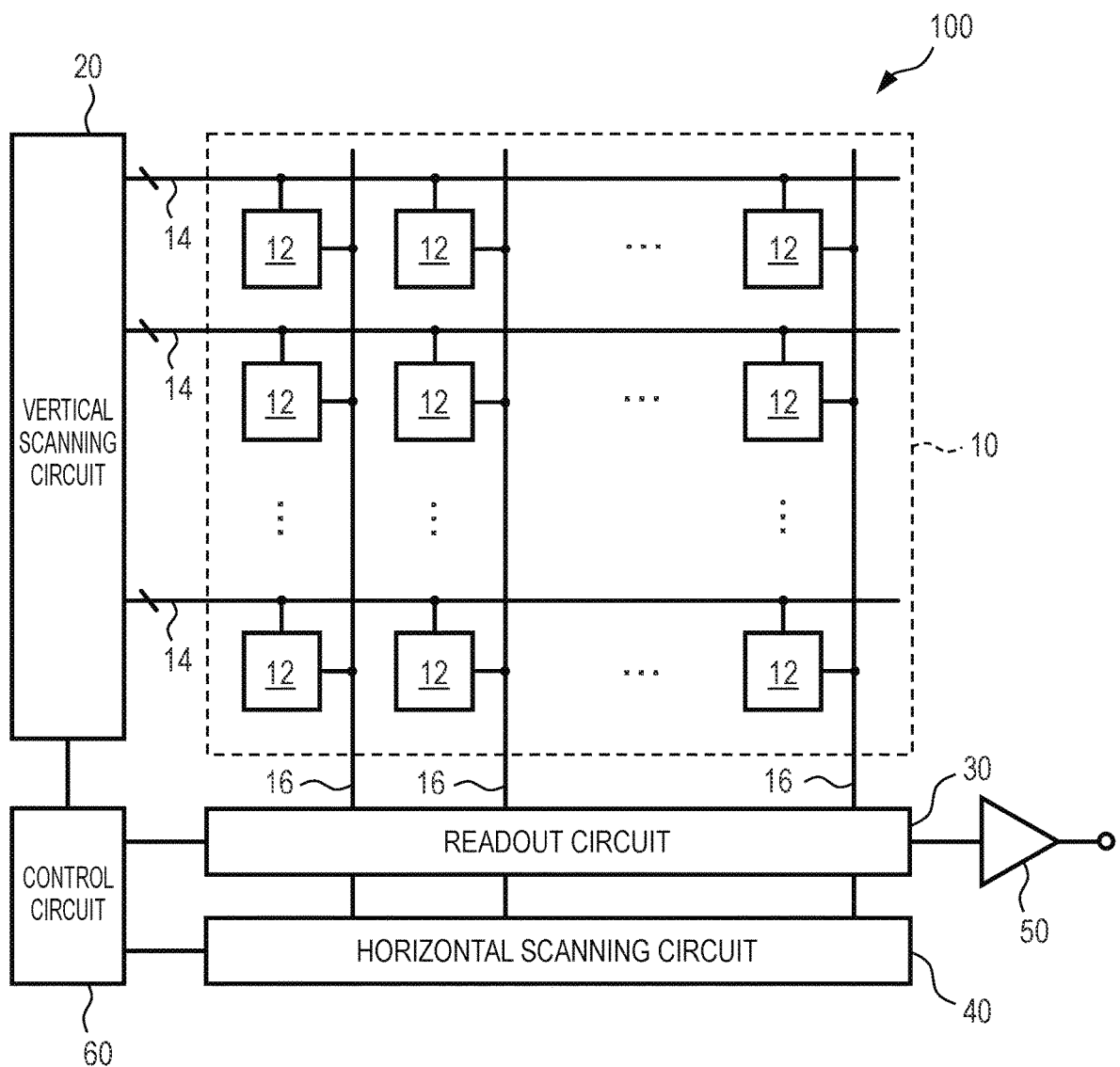
FIG. 1 is a block diagram illustrating a schematic configuration of a photoelectric conversion device according to a first embodiment of the present invention.
Figure 2:
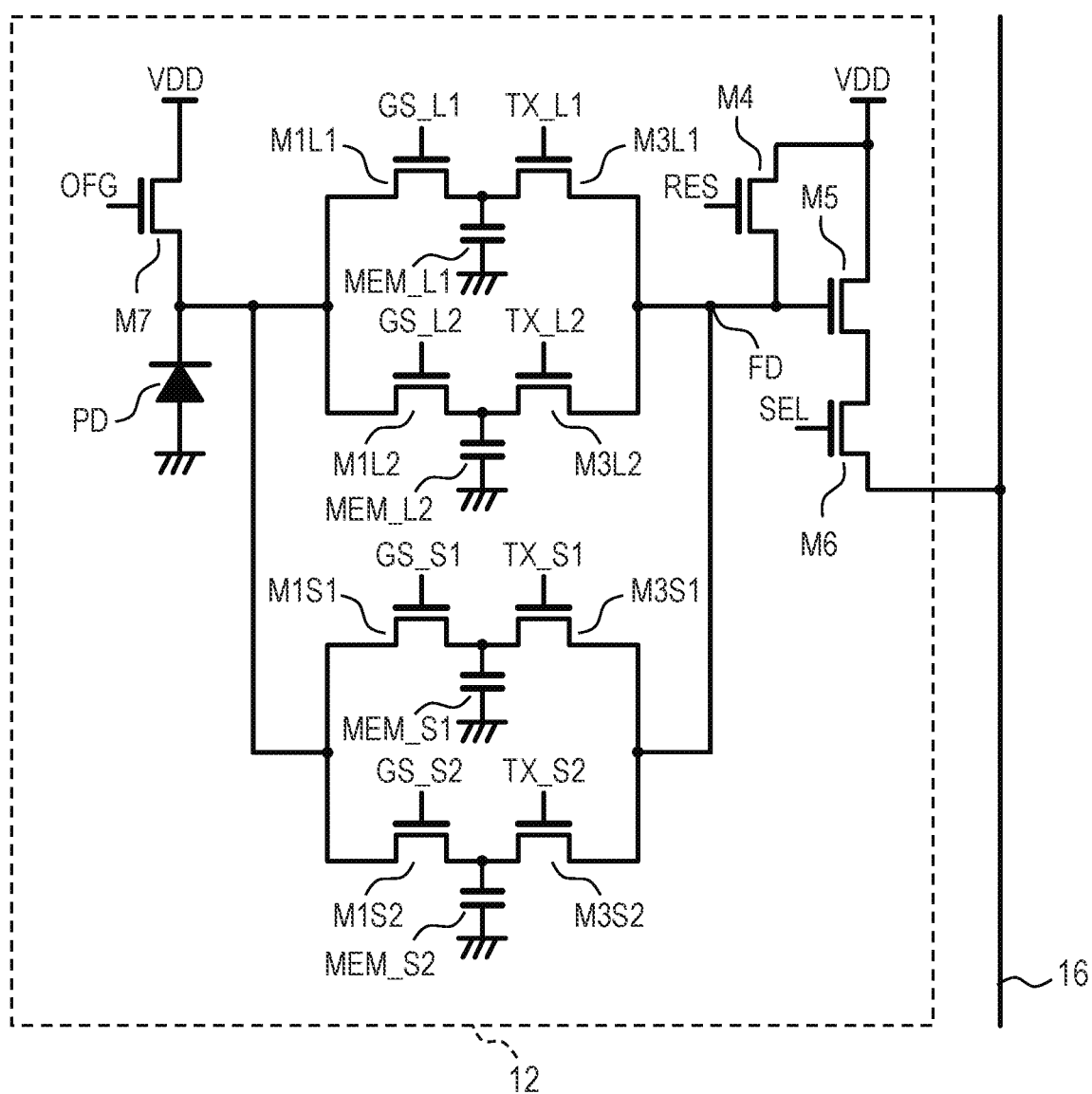
FIG. 2 is an equivalent circuit diagram illustrating a configuration example of a pixel of the photoelectric conversion device according to the first embodiment of the present invention.
Figure 3:
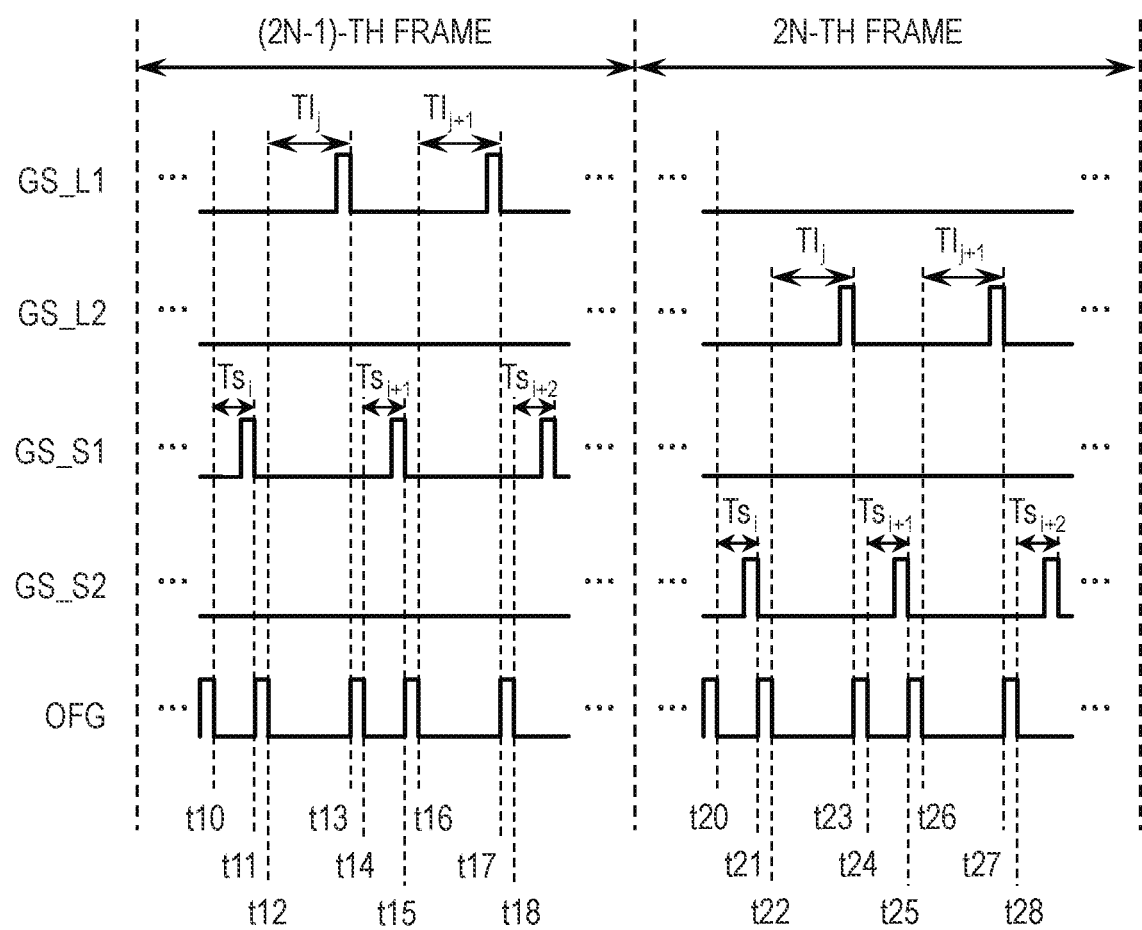
FIG. 3 and FIG. 4 are timing charts illustrating a method of driving the photoelectric conversion device according to the first embodiment of the present invention.
Figure 4:
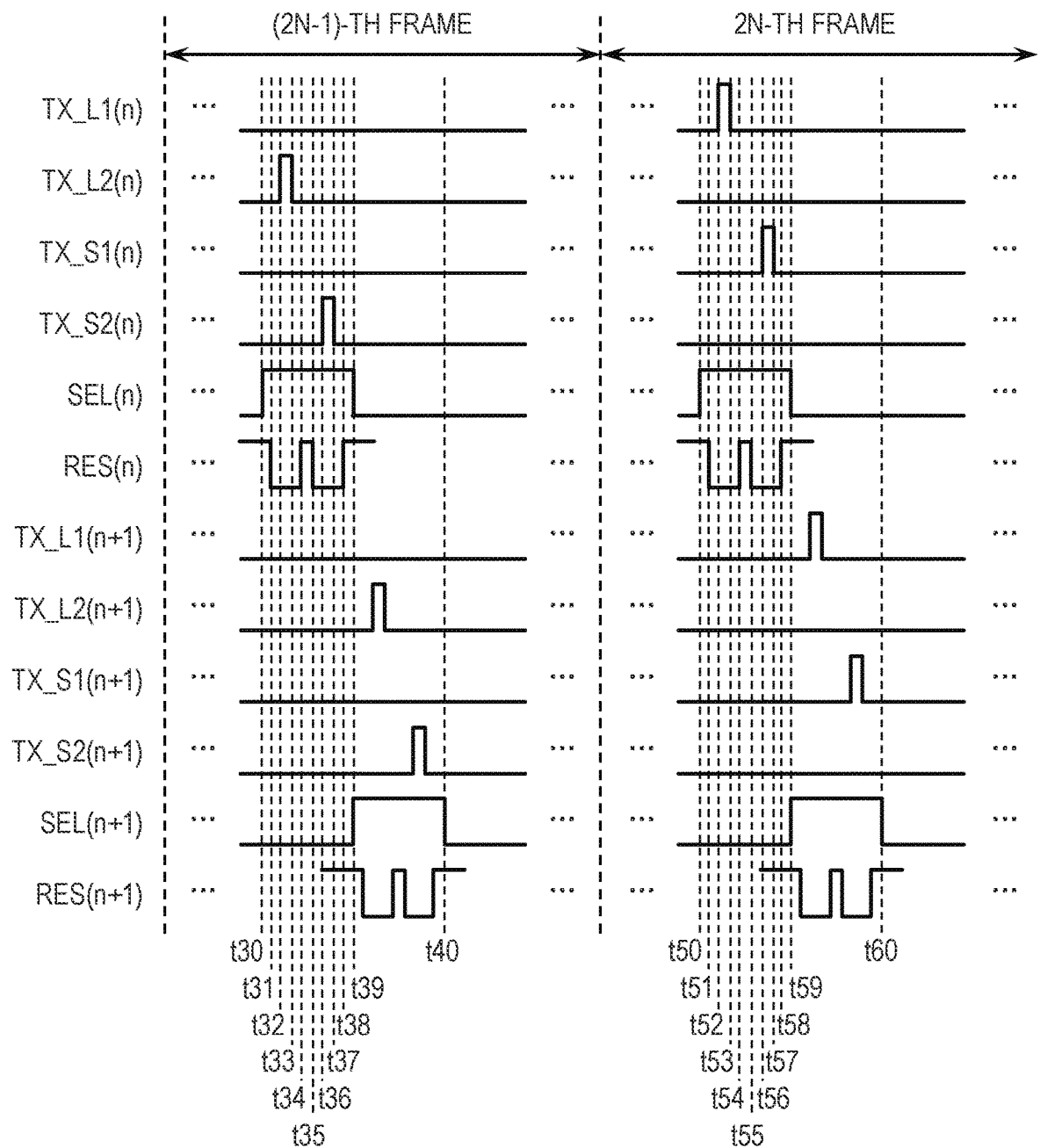

A photoelectric conversion device and a method of driving the same according to a first embodiment of the present invention will be described with reference to FIG. 1 to FIG. 4. FIG. 1 is a block diagram illustrating a schematic configuration of a photoelectric conversion device according to the present embodiment. FIG. 2 is an equivalent circuit diagram illustrating a configuration example of a pixel of the photoelectric conversion device according to the present embodiment. FIG. 3 and FIG. 4 are timing charts illustrating a method of driving the photoelectric conversion device according to the present embodiment.

First, a schematic configuration of the photoelectric conversion device according to the present embodiment will be described with reference to FIG. 1 and FIG. 2.

As illustrated in FIG. 1, the photoelectric conversion device according to the present embodiment includes a pixel unit 10, a vertical scanning circuit 20, a readout circuit 30, a horizontal scanning circuit 40, an output circuit 50, and a control circuit 60. The pixel unit 10 is connected to the vertical scanning circuit 20 and the readout circuit 30. The readout circuit 30 is connected to the horizontal scanning circuit 40 and the output circuit 50. The control circuit 60 is connected to the vertical scanning circuit 20, the readout circuit 30, and the horizontal scanning circuit 40.

The pixel unit 10 is provided with a plurality of pixels 12 arranged in a matrix form so as to form a plurality of rows and a plurality of columns. Each of the plurality of pixels 12 includes a photoelectric conversion unit including a photoelectric conversion element such as a photodiode, and outputs a pixel signal corresponding to an amount of incident light. The number of rows and columns of the pixel array arranged in the pixel unit 10 is not particularly limited. In addition, in the pixel unit 10, in addition to effective pixels that output a pixel signal according to an amount of incident light, optical black pixels in which the photoelectric conversion unit is shielded from light, dummy pixels that do not output signals, and the like may be arranged.

In each row of the pixel unit 10, a control line 14 is arranged so as to extend in a first direction (lateral direction in FIG. 1). Each of the control lines 14 is connected to each of the pixels 12 arranged in the first direction on the corresponding row, and serves as a signal line common to these pixels 12. The first direction in which the control lines 14 extend may be referred to as a row direction or a horizontal direction. Each of the control lines 14 may include a plurality of signal lines. The control lines 14 are connected to the vertical scanning circuit 20.

In each column of the pixel unit 10, a vertical output line 16 is arranged so as to extend in a second direction (vertical direction in FIG. 1) intersecting with the first direction. Each of the vertical output lines 16 is connected to each of the pixels 12 arranged in the second direction on the corresponding column, and serves as a signal line common to these pixels 12. The second direction in which the vertical output lines 16 extend may be referred to as a column direction or a vertical direction. The vertical output lines 16 are connected to the readout circuit 30.

The vertical scanning circuit 20 is a control circuit having a function of receiving a control signal from the control circuit 60, generating a control signal for driving the pixels 12, and outputting the generated control signal to the pixels 12 via the control line 14. A logic circuit such as a shift register or an address decoder may be used for the vertical scanning circuit 20. The vertical scanning circuit 20 sequentially outputs the control signals to the control lines 14 of each row, and sequentially drives the pixels 12 of the pixel unit 10 in units of rows. The signals read out from the pixels 12 in units of rows are input to the readout circuit 30 via the vertical output lines 16 arranged in each column of the pixel unit 10.

The readout circuit 30 has a function of performing predetermined processing, for example, signal processing such as amplification processing and addition processing on a signal readout from the pixel 12. The readout circuit 30 may include a signal holding portion, a column amplifier, a CDS (correlated double sampling) circuit, an addition circuit, etc. The readout circuit 30 may further include other processing circuits such as an AD (analog to digital) conversion circuit as necessary.

The horizontal scanning circuit 40 is a control circuit having a function of receiving a control signal from the control circuit 60, generating control signals for sequentially transferring the signals processed by the readout circuit 30 to the output circuit 50 for each column, and outputting the generated control signals to the readout circuit 30. A logic circuit such as a shift register or an address decoder may be used for the horizontal scanning circuit 40. The output circuit 50 is a circuit unit for amplifying and outputting a signal of a column selected by the horizontal scanning circuit 40, and is configured by a buffer amplifier, a differential amplifier, or the like. The output circuit 50 may further include a signal processing unit that performs predetermined signal processing on the pixel signals, for example, correction processing or HDR composition processing.

The control circuit 60 has a function of supplying control signals for controlling operations and timings thereof of the vertical scanning circuit 20, the readout circuit 30, and the horizontal scanning circuit 40. At least a part of the control signals supplied to the vertical scanning circuit 20, the readout circuit 30, and the horizontal scanning circuit 40 may be supplied from the outside of the photoelectric conversion device 100.

As illustrated in FIG. 2, each pixel 12 includes a photoelectric conversion unit PD and transfer transistors M1L1, M1L2, M1S1, M1S2, M3L1, M3L2, M3S1 and M3S2. Each pixel 12 further includes a reset transistor M4, an amplifier transistor M5, a select transistor M6, and a charge discharging transistor M7. The photoelectric conversion unit PD may be constituted by a photoelectric conversion element, for example, a photodiode. Each transistor may be formed of an n-channel MOS transistor when, for example, electrons are used as signal charge. Each transistor is not necessarily an n-channel MOS transistor, and each transistor may be formed of a p-channel MOS transistor and holes may be used as signal charge.

The photoelectric conversion unit PD has an anode connected to a ground node, and a cathode connected to a source of each of the transfer transistors M1L1, M1L2, M1S1, M1S2 and the charge discharging transistor M7. A drain of the transfer transistor M1L1 is connected to a source of the transfer transistor M3L1. A connection node between the drain of the transfer transistor M1L1 and the source of the transfer transistor M3L1 includes a capacitance component and functions as a charge holding portion (charge holding portion MEM_L1). A drain of the transfer transistor M1L2 is connected to a source of the transfer transistor M3L2. A connection node between the drain of the transfer transistor M1L2 and the source of the transfer transistor M3L2 includes a capacitance component and functions as a charge holding portion (charge holding portion MEM_L2). A drain of the transfer transistor M1S1 is connected to a source of the transfer transistor M3S1. A connection node between the drain of the transfer transistor M1S1 and the source of the transfer transistor M3S1 includes a capacitance component and functions as a charge holding portion (charge holding portion MEM_S1). A drain of the transfer transistor M1S2 is connected to a source of the transfer transistor M3S2. A connection node between the drain of the transfer transistor M1S2 and the source of the transfer transistor M3S2 includes a capacitance component and functions as a charge holding portion (charge holding portion MEM_S2).

The drains of the transfer transistors M3L1, M3L2, M3S1, and M3S2 are connected to a source of the reset transistor M4 and a gate of the amplifier transistor M5. The connection node of the drains of the transfer transistors M3L1, M3L2, M3S1, and M3S2, the source of the reset transistor M4, and the gate of the amplifier transistor M5 is a so-called floating diffusion FD. The floating diffusion FD includes a capacitance component (floating diffusion capacitance) and functions as a charge holding portion.

A drain of the reset transistor M4, a drain of the amplifier transistor M5, and a drain of the charge discharging transistor M7 are connected to a power supply voltage line (voltage VDD). Any two or three of the voltage supplied to the drain of the reset transistor M4, the voltage supplied to the drain of the amplifier transistor M5, and the voltage supplied to the drain of the charge discharging transistor M7 may be the same, or all may be different from each other. A source of the amplifier transistor M5 is connected to a drain of the select transistor M6. A source of the select transistor M6 is connected to the vertical output line 16.

Each of the control lines 14 includes 11 signal lines connected to gates of the transfer transistors M1L1, M1L2, M1S1, M1S2, M3L1, M3L2, M3S1, M3S2, the reset transistor M4, the select transistor M6, and the charge discharging transistor M7. The vertical scanning circuit 20 outputs a control signal GS_L1 to a signal line connected to the gate of the transfer transistor M1L1. The vertical scanning circuit 20 outputs a control signal GS_L2 to a signal line connected to the gate of the transfer transistor M1L2. The vertical scanning circuit 20 outputs a control signal GS_S1 to a signal line connected to the gate of the transfer transistor M1S1. The vertical scanning circuit 20 outputs a control signal GS_S2 to a signal line connected to the gate of the transfer transistor M1S2. The vertical scanning circuit 20 outputs a control signal TX_L1 to a signal line connected to the gate of the transfer transistor M3L1. The vertical scanning circuit 20 outputs a control signal TX_L2 to a signal line connected to the gate of the transfer transistor M3L2. The vertical scanning circuit 20 outputs a control signal TX_S1 to a signal line connected to the gate of the transfer transistor M3S1. The vertical scanning circuit 20 outputs a control signal TX_S2 to a signal line connected to the gate of the transfer transistor M3S2. The vertical scanning circuit 20 outputs a control signal RES to a signal line connected to the gate of the reset transistor M4. The vertical scanning circuit 20 outputs a control signal SEL to a signal line connected to the gate of the select transistor M6. The vertical scanning circuit 20 outputs a control signal OFG to a signal line connected to the gate of the charge discharging transistor M7. When each transistor is formed of an n-channel transistor, the corresponding transistor is turned on when a high-level control signal is supplied from the vertical scanning circuit 20, and the corresponding transistor is turned off when a low-level control signal is supplied from the vertical scanning circuit 20.

The photoelectric conversion unit PD converts (photoelectrically converts) incident light into charge of an amount corresponding to an amount of the incident light, and accumulates the generated charge. The transfer transistor M1L1 has a function as a transfer unit that performs a transfer operation of transferring the charge held in the photoelectric conversion unit PD to the charge holding portion MEM_L1 by turning on. The transfer transistor M3L1 has a function as a transfer unit that performs a transfer operation of transferring the charge held in the charge holding portion MEM_L1 to the floating diffusion FD by turning on. The transfer transistor M1L2 has a function as a transfer unit that performs a transfer operation of transferring charge held in the photoelectric conversion unit PD to the charge holding portion MEM_L2 by turning on. The transfer transistor M3L2 has a function as a transfer unit that performs a transfer operation of transferring the charge held in the charge holding portion MEM_L2 to the floating diffusion FD by turning on. The transfer transistor M1S1 has a function as a transfer unit that performs a transfer operation of transferring the charge held in the photoelectric conversion unit PD to the charge holding portion MEM_S1 by turning on. The transfer transistor M3S1 has a function as a transfer unit that performs a transfer operation of transferring the charge held in the charge holding portion MEM_S1 to the floating diffusion FD by turning on. The transfer transistor M1S2 has a function as a transfer unit that performs a transfer operation of transferring the charge held in the photoelectric conversion unit PD to the charge holding portion MEM_S2 by turning on. The transfer transistor M3S2 has a function as a transfer unit that performs a transfer operation of transferring the charge held in the charge holding portion MEM_S2 to the floating diffusion FD by turning on.

The amplifier transistor M5 is configured such that a voltage VDD is supplied to the drain and a bias current is supplied from a current source (not illustrated) to the source via the select transistor M6, and constitutes an amplifier unit (source follower circuit) having the gate as an input node. Accordingly, the amplifier transistor M5 outputs a signal corresponding to the potential of the floating diffusion FD to the vertical output line 16 via the select transistor M6. In this sense, it can be said that the floating diffusion FD, the amplifier transistor M5, and the select transistor M6 constitute an output unit which outputs a signal corresponding to the amount of charge held in the floating diffusion FD. Although FIG. 2 illustrates a configuration in which four transfer units (transfer transistors M3L1, M3L2, M3S1, and M3S2) share one floating diffusion FD or output unit, the floating diffusion FD or the output unit may be individually connected to each of the four transfer units.

The reset transistor M4 has a function as a reset unit that performs a reset operation of resetting the floating diffusion FD to a voltage corresponding to the voltage VDD by turning on. The charge discharging transistor M7 has a function as an overflow drain unit which drains the charge held in the photoelectric conversion unit PD by turning on. Alternatively, it can be said that the charge discharging transistor M7 has a function as a reset unit which performs a reset operation of resetting the photoelectric conversion unit PD to a voltage corresponding to the voltage VDD by turning on. The select transistor M6 has a function as a selection unit that selects whether or not a signal corresponding to the source voltage of the amplifier transistor M5 is output to the vertical output line 16 as a pixel signal.

Next, a method of driving the photoelectric conversion device according to the present embodiment will be described with reference to FIG. 3 and FIG. 4. FIG. 3 is a timing chart illustrating a scheme of driving relating to a pixel exposure operation, and FIG. 4 is a timing chart illustrating a scheme of driving relating to a pixel signal readout operation.

FIG. 3 illustrates temporal changes of the control signals GS_L1, GS_L2, GS_S1, GS_S2, and OFG respectively supplied to the transfer transistors M1L1, M1L2, M1S1, and M1S2 and the charge discharging transistor M7 in the (2N−1)-th frame and the 2N-th frame. Here, N is an integer of 1 or more. When each control signal is at high-level, the corresponding transistor becomes active (on-state). In the present embodiment, since the global shutter method is performed, the driving related to the exposure operation and the timing thereof are simultaneously performed in the pixels 12 in all the rows. Here, "simultaneous" means that each row is designed to be driven simultaneously, and there may be a manufacturing error or a difference based on a design layout. That is, if there is an intention to drive the transistors of each row globally in all the rows collectively, the phrase "simultaneous" is satisfied even if there is a signal delay due to a difference in length of the driving line of each row or the like.

In each frame, a plurality of times (Ks times) of accumulation periods Ts and a plurality of times (Kl times) of accumulation periods Tl are executed. Each of the accumulation periods Ts is a period for accumulating signal charge in the charge holding portion MEM_S1 or the charge holding portion MEM_S2, and each of the accumulation periods Tl is a period for accumulating signal charge in the charge holding portion MEM_L1 or the charge holding portion MEM_L2. The operation of the i-th accumulation period $Ts_i$ and the (i+1)-th accumulation period $Ts_{i+1}$ out of Ks times and the operation of the j-th accumulation period $Tl_j$ and the (j+1)-th accumulation period $Tl_{j+1}$ out of Kl times will be described below with reference to FIG. 3. Here, i is an integer of 1 to Ks−2. J is an integer of 1 to Kl−1. The number of times Ks and Kl may be appropriately set according to a total accumulation time or the like in one frame period, and the number of times Ks and Kl may be the same or different.

First, an exposure operation in the odd-numbered frame (the (2N−1)-th frame) will be described. In the odd-numbered frame, the signal charge generated in the photoelectric conversion unit PD is accumulated in each of the charge holding portions MEM_L1 and MEM_S1, and a signal based on the signal charge accumulated in the charge holding portion MEM_L2 and a signal based on the signal charge accumulated in the charge holding portion MEM_S2 are read out.

It is assumed that the control signal OFG is at high-level immediately before time t10. The charge discharging transistor M7 is turned on in response to the high-level control signal OFG, and the photoelectric conversion unit PD is reset to a potential corresponding to the voltage VDD.

At the time t10, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Ts_i$ in the photoelectric conversion unit PD. The signal charge generated by the incidence of photons into the photoelectric conversion unit PD while the charge discharging transistor M7 is off is accumulated in the photoelectric conversion unit PD.

During a period from a predetermined timing after the time t10 to time t11, the vertical scanning circuit 20 controls the control signal GS_S1 to high-level. As a result, the transfer transistor M1S1 is turned on, and the signal charge accumulated in the photoelectric conversion unit PD is transferred to the charge holding portion MEM_S1. The time t11 when the transfer transistor M1S1 is turned off is an end time of the accumulation period $Ts_i$ in the photoelectric conversion unit PD. That is, the period from the time t10 to the time t11 is the accumulation period $Ts_i$ of the signal charge.

After the time t11, the vertical scanning circuit 20 controls the control signal OFG from low-level to high-level. As a result, the charge discharging transistor M7 is turned on, and the photoelectric conversion unit PD is reset to a potential corresponding to the voltage VDD.

At subsequent time t12, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Tl_j$ in the photoelectric conversion unit PD. The signal charge generated by the incidence of photons into the photoelectric conversion unit PD while the charge discharging transistor M7 is off is accumulated in the photoelectric conversion unit PD.

Although the photoelectric conversion unit PD is reset by turning on the charge discharging transistor M7 here, the reset of the photoelectric conversion unit PD by the charge discharging transistor M7 may be omitted in the case of a configuration in which no signal charge remains in the photoelectric conversion unit PD during charge transfer. In this case, the timing (time t11) at which the transfer transistor (here, the transfer transistor M1S1) is turned off is the start time of the accumulation period $Tl_j$ in the photoelectric conversion unit PD. The same applies to the other accumulation periods Ts and Tl. Complete transfer of the signal charge from the photoelectric conversion unit PD to the charge holding portion MEM may be realized by potential design of the photoelectric conversion unit PD, the transfer transistor M1, the charge holding portion MEM, and the like.

During a period from a predetermined timing after the time t12 to time t13, the vertical scanning circuit 20 controls the control signal GS_L1 to high-level. As a result, the transfer transistor M1L1 is turned on, and the signal charge accumulated in the photoelectric conversion unit PD is transferred to the charge holding portion MEM_L1. The time t13 when the transfer transistor M1L1 is turned off is an end time of the accumulation period $Tl_j$ in the photoelectric conversion unit PD. That is, the period from the time t12 to the time t13 is the accumulation period $Tl_j$ of the signal charge.

Thereafter, similarly to the period from the time t10 to the time t13, the accumulation periods Ts and the accumulation periods Tl are repeatedly performed a predetermined number of times. For example, as illustrated in FIG. 3, the accumulation period $Ts_{i+1}$ is performed during a period from time t14 to time t15, the accumulation period $Tl_j+_1$ is performed during a period from time t16 to time t17, and the accumulation period $Ts_i+2$ is performed during a period from time t18.

In this manner, the Ks-number of accumulation periods Ts and the Kl-number of accumulation periods Tl are executed in odd-numbered frames. As a result, the charge holding portion MEM_S1 holds the signal charge generated by the photoelectric conversion unit PD during the accumulation period Tshort of the total length of the Ks-number of periods from the accumulation period $Ts_1$ to the accumulation period $Ts_{Ks}$. The charge holding portion MEM_L1 holds the signal charge generated by the photoelectric conversion unit PD during the accumulation period Tlong of the total length of the Kl-number of periods from the accumulation period $Tl_1$ to the accumulation period $Tl_{Kl}$.

Next, an exposure operation in the even-numbered frame (the 2N-th frame) will be described. In the even-numbered frame, the signal charge generated in the photoelectric conversion unit PD is accumulated in each of the charge holding portions MEM_L2 and MEM_S2, and a signal based on the signal charge accumulated in the charge holding portion MEM_L1 and a signal based on the signal charge accumulated in the charge holding portion MEM_S1 are read out.

It is assumed that the control signal OFG is at high-level immediately before time t20. The charge discharging transistor M7 is turned on in response to the high-level control signal OFG, and the photoelectric conversion unit PD is reset to a potential corresponding to the voltage VDD.

At time t20, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Ts_i$ in the photoelectric conversion unit PD. The signal charge generated by the incidence of photons into the photoelectric conversion unit PD while the charge discharging transistor M7 is off is accumulated in the photoelectric conversion unit PD.

During a period from a predetermined timing after the time t20 to time t21, the vertical scanning circuit 20 controls the control signal GS_S2 to high-level. As a result, the transfer transistor M1S2 is turned on, and the signal charge accumulated in the photoelectric conversion unit PD are transferred to the charge holding portion MEM_S2. The time t21 at which the transfer transistor M1S2 is turned off is an end time of the accumulation period $Ts_i$ in the photoelectric conversion unit PD. That is, the period from the time t20 to the time t21 is the accumulation period $Ts_i$ of the signal charge.

After the time t21, the vertical scanning circuit 20 controls the control signal OFG from low-level to high-level. As a result, the charge discharging transistor M7 is turned on, and the photoelectric conversion unit PD is reset to a potential corresponding to the voltage VDD.

At subsequent time t22, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Tl_j$ in the photoelectric conversion unit PD. The signal charge generated by the incidence of photons into the photoelectric conversion unit PD while the charge discharging transistor M7 is off is accumulated in the photoelectric conversion unit PD.

During a period from a predetermined timing after the time t22 to time t23, the vertical scanning circuit 20 controls the control signal GS_L2 to high-level. As a result, the transfer transistor M1L2 is turned on, and the signal charge accumulated in the photoelectric conversion unit PD is transferred to the charge holding portion MEM_L2. The time t23 at which the transfer transistor M1L2 is turned off is an end time of the accumulation period $Tl_j$ in the photoelectric conversion unit PD. That is, the period from the time t22 to the time t23 is the accumulation period $Tl_j$ of the signal charge.

Thereafter, similarly to the period from the time t20 to the time t23, the accumulation periods Ts and the accumulation periods Tl are repeatedly performed a predetermined number of times. For example, as illustrated in FIG. 3, the accumulation period $Ts_{i+1}$ is performed during a period from time t24 to time t25, the accumulation period $Tl_j+_1$ is performed during a period from time t26 to time t27, and the accumulation period $Ts_i+2$ is performed during a period from time t28.

In this manner, the Ks-number of accumulation periods Ts and the Kl-number of accumulation periods Tl are also executed in even-numbered frames. As a result, the charge holding portion MEM_S2 holds the signal charge generated by the photoelectric conversion unit PD during the accumulation period Tshort of the total length of the Ks-number of periods from the accumulation period $Ts_i$ to the accumulation period $Ts_{Ks}$. The charge holding portion MEM_L2 holds the signal charge generated by the photoelectric conversion unit PD during the accumulation period Tlong of the total length of the Kl-number of periods from the accumulation period $Tl_1$ to the accumulation period $Tl_{Kl}$.

FIG. 4 illustrates temporal changes of the control signals TX_L1, TX_L2, TX_S1, TX_S2, RES and SEL supplied to the transfer transistors M3L1, M3L2, M3S1, M3S2, the reset transistor M4 and the select transistor M6 in the (2N−1)-th frame and the 2N-th frame. When each control signal is at high-level, the corresponding transistor becomes active (on-state). Here, the pixel signal readout operation is sequentially executed for each row. FIG. 4 illustrates the control signals supplied to the pixels 12 in the n-th row and the control signals supplied to the pixels 12 in the (n+1)-th row among the control signals corresponding to the plurality of rows constituting the pixel unit 10. The control signals supplied to the pixels 12 of the n-th row are labeled by adding (n) to the reference numerals thereof, and the control signals supplied to the pixels 12 of the (n+1)-th row are labeled by adding (n+1) to the reference numerals thereof.

First, the readout operation in the odd-numbered frame (the (2N–1)-th frame) will be described. In the odd-numbered frame, as described above, a signal readout operation based on the signal charge accumulated in the charge holding portion MEM_L2 and a signal readout operation based on the signal charge accumulated in the charge holding portion MEM_S2 are performed. In the (2N–1)-th frame, the signal charge accumulated in the (2N–2)-th frame (not illustrated) is held in each of the charge holding portion MEM_L2 and the charge holding portion MEM_S2 of each pixel 12. Note that the readout operation of each frame may be performed in parallel with the above-described exposure operation.

It is assumed that the control signals TX_L1(n), TX_L2(n), TX_S1(n), TX_S2(n) and SEL(n) are at low-level and the control signal RES(n) is at high-level immediately before time t30.

At the time t30, the vertical scanning circuit 20 controls the control signal SEL(n) from low-level to high-level. As a result, the select transistor M6 of each of the pixels 12 of the n-th row is turned on, and the amplifier transistor M5 of each of the pixels 12 of the n-th row is connected to the vertical output line 16 of the corresponding column via the select transistor M6, so that the pixels 12 of the n-th row are set to a selected state that the pixel signal may be read out. At this time, the reset transistor M4 is on-state, and the floating diffusion FD is reset to a potential corresponding to the voltage VDD. Thereby, a signal corresponding to the reset potential of the floating diffusion FD is output to the vertical output line 16.

At subsequent time t31, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t32 to time t33, the vertical scanning circuit 20 controls the control signal TX_L2(n) from low-level to high-level. As a result, the transfer transistor M3L2 of each of the pixels 12 of the n-th row is turned on, and the signal charge held in the charge holding portion MEM_L2 is transferred to the floating diffusion FD. Then, the floating diffusion FD becomes a potential corresponding to an amount of signal charge transferred from the charge holding portion MEM_L2, and a voltage corresponding to the potential of the floating diffusion FD is output to the vertical output line 16. The voltage of the vertical output line 16 settled after the transfer transistor M3L2 turns off at time t33 is a signal level voltage VSIG of the pixel 12. Thus, the signal level voltage VSIG of the pixel 12 based on the signal charge held in the charge holding portion MEM_L2 is read out to the vertical output line 16.

The difference between the reset level voltage VRES and the signal level voltage VSIG obtained in this manner, i.e., |VSIG–VRES|, is a physical quantity corresponding to an amount of signal charge held in the charge holding portion MEM_L2.

At subsequent time t34, the vertical scanning circuit 20 controls the control signal RES(n) from low-level to high-level. Accordingly, the reset transistor M4 of each of the pixels 12 of the n-th row is turned on, and the floating diffusion FD is reset to a potential corresponding to the voltage VDD. A signal corresponding to the reset potential of the floating diffusion FD is output to the vertical output line 16.

At subsequent time t35, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t36 to time t37, the vertical scanning circuit 20 controls the control signal TX_S2(n) from low-level to high-level. As a result, the transfer transistor M3S2 of each of the pixels 12 of the n-th row is turned on, and the signal charge held in the charge holding portion MEM_S2 is transferred to the floating diffusion FD. Then, the floating diffusion FD has a potential corresponding to an amount of signal charge transferred from the charge holding portion MEM_S2, and a voltage corresponding to the potential of the floating diffusion FD is output to the vertical output line 16. The voltage of the vertical output line 16 settled after the transfer transistor M3S2 turns off at time t37 is a signal level voltage VSIG of the pixel 12. Thus, the signal level voltage VSIG of the pixel 12 based on the signal charge held in the charge holding portion MEM_S2 is read out to the vertical output line 16.

The difference between the reset level voltage VRES and the signal level voltage VSIG obtained in this manner, i.e., the difference |VSIG–VRES| becomes a physical quantity corresponding to an amount of signal charge held in the charge holding portion MEM_S2.

At subsequent time t38, the vertical scanning circuit 20 controls the control signal RES(n) from low-level to high-level. Accordingly, the reset transistor M4 of each of the pixels 12 of the n-th row is turned on, and the floating diffusion FD is reset to a potential corresponding to the voltage VDD.

At subsequent time t39, the vertical scanning circuit 20 controls the control signal SEL(n) from high-level to low-level. Thereby, the select transistor M6 of each of the pixels 12 of the n-th row is turned off, and the selection of the n-th row is released.

In a period from the time t39 to subsequent time t40 following the time t39, similarly to the period from the time t30 to the time t39, a signal based on the signal charge accumulated in the charge holding portion MEM_L2 and a signal based on the signal charge accumulated in the charge holding portion MEM_S2 are read from each of the pixels 12 of the (n+1)-th row. The same applies to the readout operation of the pixels 12 in the other rows.

Next, the readout operation in the even-numbered frame (the 2N-th frame) will be described. In the even-numbered frame, as described above, a signal readout operation based on the signal charge accumulated in the charge holding portion MEM_L1 and a signal readout operation based on the signal charge accumulated in the charge holding portion MEM_S1 are performed. In the 2N-th frame, the signal charge accumulated in the (2N–1)-th frame is held in each of the charge holding portion MEM_L1 and the charge holding portion MEM_S1 of each pixel 12.

It is assumed that the control signals TX_L1(n), TX_L2(n), TX_S1(n), TX_S2(n) and SEL(n) are at low-level, and the control signal RES(n) is at high-level immediately before the time t50.

At the time t50, the vertical scanning circuit 20 controls the control signal SEL(n) from low-level to high-level. As a result, the select transistor M6 of each of the pixels 12 of the n-th row is turned on, and the amplifier transistor M5 of each of the pixels 12 of the n-th row is connected to the vertical output line 16 of the corresponding column via the select transistor M6, so that the pixels 12 of the n-th row are set to a selected state that the pixel signal may be read out. At this time, the reset transistor M4 is on-state, and the floating diffusion FD is reset to a potential corresponding to the voltage VDD. Thereby, a signal corresponding to the reset potential of the floating diffusion FD is output to the vertical output line 16.

At subsequent time t51, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t52 to time t53, the vertical scanning circuit 20 controls the control signal TX_L1(n) from low-level to high-level. As a result, the transfer transistor M3L1 of the pixel 12 of the n-th row is turned on, and the signal charge held in the charge holding portion MEM_L1 is transferred to the floating diffusion FD. Then, the floating diffusion FD has a potential corresponding to an amount of signal charge transferred from the charge holding portion MEM_L1, and a voltage corresponding to the potential of the floating diffusion FD is output to the vertical output line 16. The voltage of the vertical output line 16 settled after the transfer transistor M3L1 turns off at time t53 is a signal level voltage VSIG of the pixel 12. Thus, the signal level voltage VSIG of the pixel 12 based on the signal charge held in the charge holding portion MEM_L1 is read out to the vertical output line 16.

The difference between the reset level voltage VRES and the signal level voltage VSIG obtained in this manner, i.e., |VSIG−VRES|, is a physical quantity corresponding to an amount of signal charge held in the charge holding portion MEM_L1.

At subsequent time t54, the vertical scanning circuit 20 controls the control signal RES(n) from low-level to high-level. Accordingly, the reset transistor M4 of each of the pixels 12 of the n-th row is turned on, and the floating diffusion FD is reset to a potential corresponding to the voltage VDD. A signal corresponding to the reset potential of the floating diffusion FD is output to the vertical output line 16.

At subsequent time t55, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t56 to time t57, the vertical scanning circuit 20 controls the control signal TX_S1(n) from low-level to high-level. As a result, the transfer transistor M3S1 of each of the pixels 12 of the n-th row is turned on, and the signal charge held in the charge holding portion MEM_S1 is transferred to the floating diffusion FD. Then, the floating diffusion FD has a potential corresponding to an amount of signal charge transferred from the charge holding portion MEM_S1, and a voltage corresponding to the potential of the floating diffusion FD is output to the vertical output line 16. The voltage of the vertical output line 16 settled after the transfer transistor M3S1 turns off at time t57 is a signal level voltage VSIG of the pixel 12. Thus, the signal level voltage VSIG of the pixel 12 based on the signal charge held in the charge holding portion MEM_S1 is read out to the vertical output line 16.

The difference between the reset level voltage VRES and the signal level voltage VSIG obtained in this manner, i.e., the difference |VSIG−VRES| becomes a physical quantity corresponding to an amount of signal charge held in the charge holding portion MEM_S1.

At subsequent time t58, the vertical scanning circuit 20 controls the control signal RES(n) from low-level to high-level. Accordingly, the reset transistor M4 of each of the pixels 12 of the n-th row is turned on, and the floating diffusion FD is reset to a potential corresponding to the voltage VDD.

At subsequent time t59, the vertical scanning circuit 20 controls the control signal SEL(n) from high-level to low-level. Thereby, the select transistor M6 of each of the pixels 12 of the n-th row is turned off, and the selection of the n-th row is released.

During the period from the subsequent time t59 to time t60, similarly to the period from the time t50 to the time t59, a signal based on the signal charge accumulated in the charge holding portion MEM_L1 and a signal based on the signal charge accumulated in the charge holding portion MEM_S1 are read from each of the pixels 12 of the (n+1)-th row. The same applies to the readout operation of the pixels 12 in the other rows.

In the driving examples described with reference to FIG. 3 and FIG. 4, the length of the accumulation period Tlong and the length of the accumulation period Tshort may be the same, but are preferably different. By changing the length of the accumulation period Tlong and the length of the accumulation period Tshort, two kinds of images with different effective exposure amounts may be acquired in the same frame. An image having a wide dynamic range (HDR image) may be obtained by correcting one of the two types of images acquired in this manner according to the ratio of the length of the accumulation period and combining the signals of the other image with one image. The composition processing of the HDR image may be performed by a signal processing unit in the photoelectric conversion device, or may be performed by an external signal processing device.

In the present embodiment, the accumulation period Tshort is divided into the Ks-number of accumulation periods Ts, and the accumulation period Tlong is divided into the Kl-number of accumulation periods Tl, and these periods are alternately executed. By configuring the accumulation periods in this manner, time regions each of which the signal charge is acquired may be suppressed from being biased in the frame and may be dispersed in the frame. As a result, as compared with the case where each of the accumulation period Tshort and the accumulation period Tlong is executed in one continuous period, it is possible to suppress image rattling between frames at the time of moving image shooting. In particular, it is possible to obtain a significant effect when photographing an object moving in the screen at high speed or a flashing light source. Further, a position of a temporal centroid of the accumulation period Tshort and a position of a temporal centroid of the accumulation period Tlong may be brought close to each other, and a composite image of good quality may be acquired.

In addition, the pixel 12 of the photoelectric conversion device according to the present embodiment includes a charge holding portion for holding the signal charge of the previous frame in addition to a charge holding portion for accumulating the signal charge. Accordingly, the signal readout operation may be performed even in a period in which the signal charge is accumulated, and time regions in which the signal charge cannot be acquired may be reduced in each frame period, whereby a seamless moving image may be acquired.

As described above, according to the present embodiment, it is possible to acquire moving images of high quality and high dynamic range.

Second Embodiment

Figure 5:
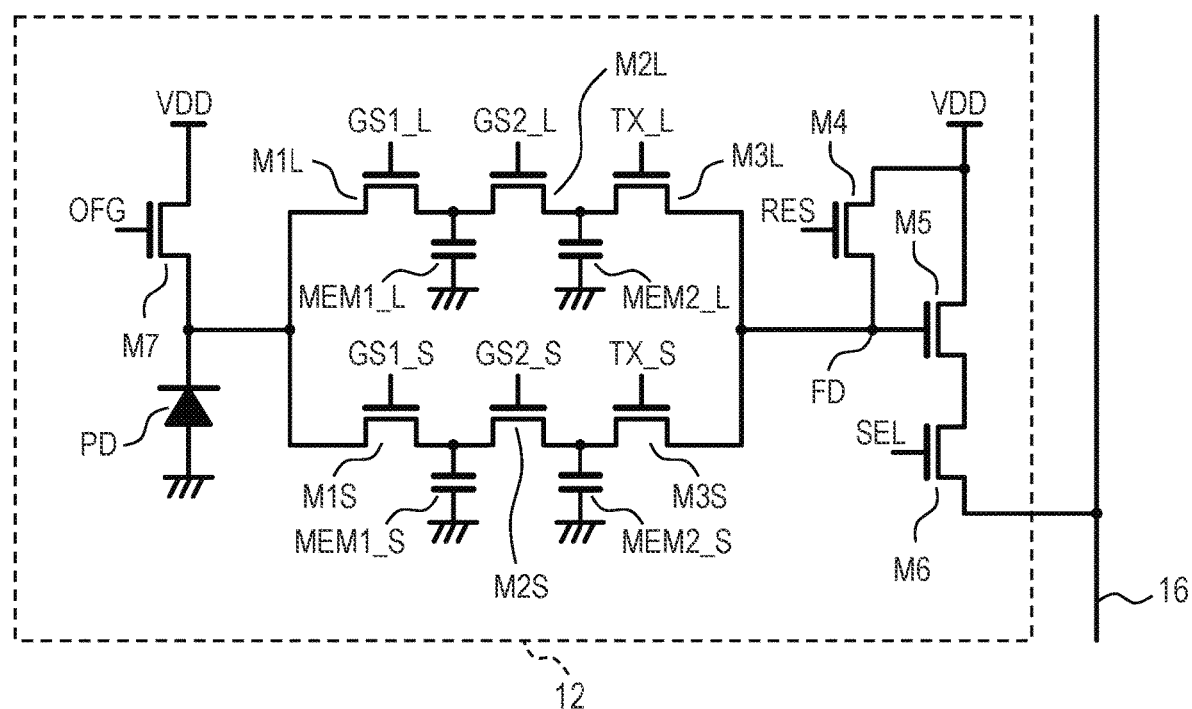
FIG. 5 is an equivalent circuit diagram illustrating a configuration example of a pixel of a photoelectric conversion device according to a second embodiment of the present invention.
Figure 6:
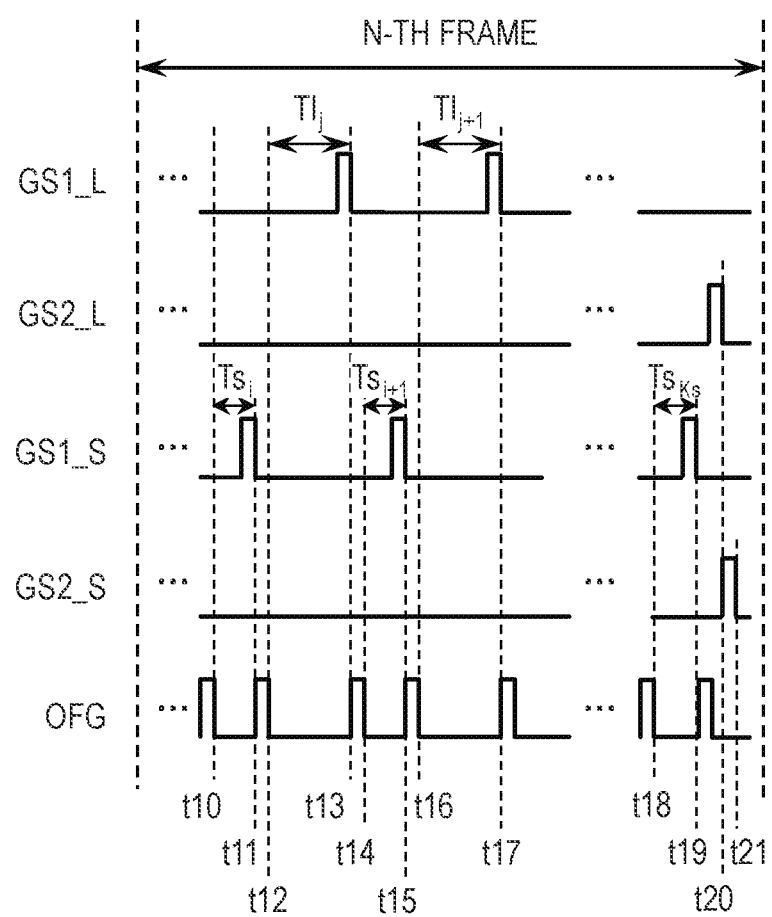
FIG. 6 and FIG. 7 are timing charts illustrating a method of driving the photoelectric conversion device according to the second embodiment of the present invention.
Figure 7:
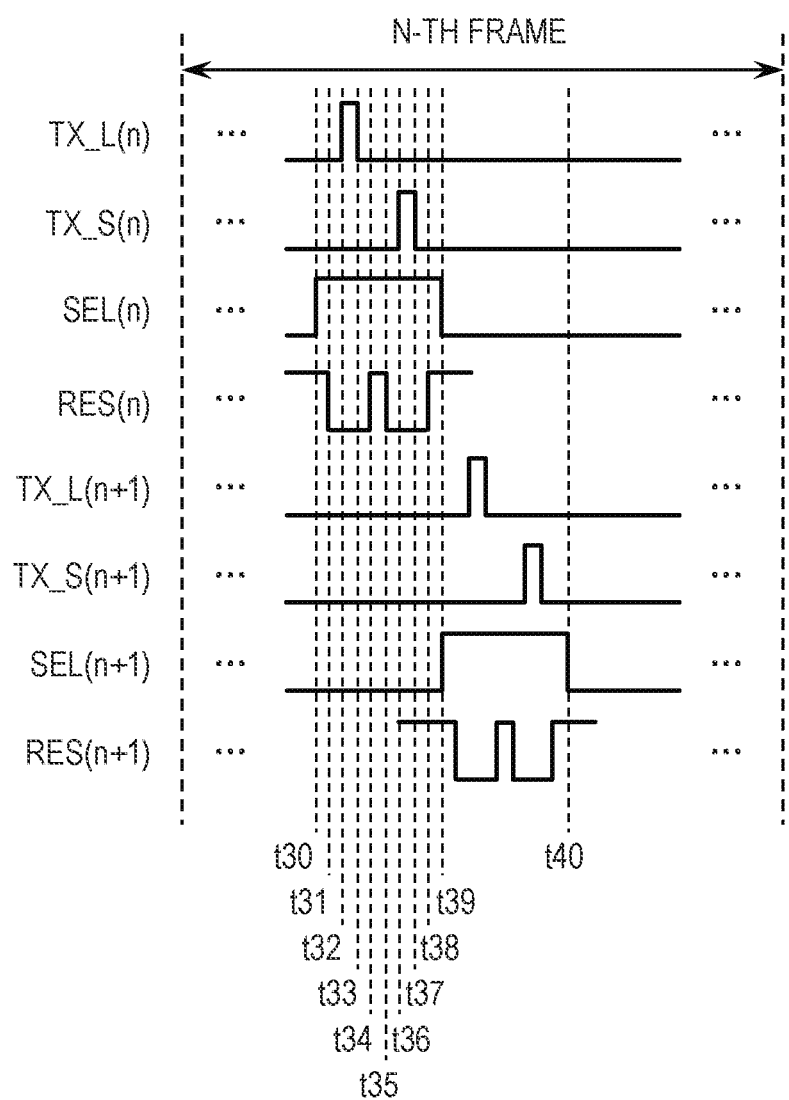

A photoelectric conversion device and a method of driving the same according to a second embodiment of the present invention will be described with reference to FIG. 5 to FIG. 7. Components similar to those of the photoelectric conversion device according to the first embodiment are denoted by the same reference numerals, and description thereof will be omitted or simplified. FIG. 5 is an equivalent circuit diagram illustrating a configuration example of a pixel of the photoelectric conversion device according to the present embodiment. FIG. 6 and FIG. 7 are timing charts illustrating a method of driving the photoelectric conversion device according to the present embodiment.

The photoelectric conversion device according to the present embodiment is the same as the photoelectric conversion device according to the first embodiment except that the configuration of the pixel 12 is different. In the present embodiment, differences from the photoelectric conversion device according to the first embodiment will be mainly described, and description of the same portions as those of the photoelectric conversion device according to the first embodiment will be appropriately omitted.

As illustrated in FIG. 5, each pixel 12 in the photoelectric conversion device according to the present embodiment includes a photoelectric conversion unit PD and transfer transistors M1L, M1S, M2L, M2S, M3L, and M3S. Each pixel 12 further includes a reset transistor M4, an amplifier transistor M5, a select transistor M6, and a charge discharging transistor M7.

The photoelectric conversion unit PD has an anode connected to the ground node, and a cathode connected to a source of the transfer transistor M1L, a source of the transfer transistor M1S, and a source of the charge discharging transistor M7. A drain of the transfer transistor M1L is connected to a source of the transfer transistor M2L. A connection node between the drain of the transfer transistor M1L and the source of the transfer transistor M2L includes a capacitance component and functions as a charge holding portion (charge holding portion MEM1_L). A drain of the transfer transistor M2L is connected to a source of the transfer transistor M3L. A connection node between the drain of the transfer transistor M2L and the source of the transfer transistor M3L includes a capacitance component and functions as a charge holding portion (charge holding portion MEM2_L). A drain of the transfer transistor M1S is connected to a source of the transfer transistor M2S. A connection node between the drain of the transfer transistor M1S and the source of the transfer transistor M2S includes a capacitance component and functions as a charge holding portion (charge holding portion MEM1_S). A drain of the transfer transistor M2S is connected to a source of the transfer transistor M3S. A connection node between the drain of the transfer transistor M2S and the source of the transfer transistor M3S includes a capacitance component and functions as a charge holding portion (charge holding portion MEM2_S).

A drain of the transfer transistor M3L and a drain of the transfer transistor M3S are connected to a source of the reset transistor M4 and a gate of the amplifier transistor M5. The connection node of the drain of the transfer transistor M3L, the drain of the transfer transistor M3S, the source of the reset transistor M4 and the gate of the amplifier transistor M5 is a so-called floating diffusion FD. The floating diffusion FD includes a capacitance component (floating diffusion capacitance) and functions as a charge holding portion.

A drain of the reset transistor M4, a drain of the amplifier transistor M5, and a drain of the charge discharging transistor M7 are connected to a power supply voltage line (voltage VDD). A source of the amplifier transistor M5 is connected to a drain of the select transistor M6. A source of the select transistor M6 is connected to the vertical output line 16.

Each of the control lines 14 includes nine signal lines connected to gates of the transfer transistors M1L, M1S, M2L, M2S, M3L, M3S, the reset transistor M4, the select transistor M6, and the charge discharging transistor M7. The vertical scanning circuit 20 outputs a control signal GS1_L to a signal line connected to the gate of the transfer transistor M1L. The vertical scanning circuit 20 outputs a control signal GS2_L to a signal line connected to the gate of the transfer transistor M2L. The vertical scanning circuit 20 outputs a control signal TX_L to a signal line connected to the gate of the transfer transistor M3L. The vertical scanning circuit 20 outputs a control signal GS1_S to a signal line connected to the gate of the transfer transistor M1S. The vertical scanning circuit 20 outputs a control signal GS2_S to a signal line connected to the gate of the transfer transistor M2S. The vertical scanning circuit 20 outputs a control signal TX_S to a signal line connected to the gate of the transfer transistor M3S. The vertical scanning circuit 20 outputs a control signal RES to a signal line connected to the gate of the reset transistor M4. The vertical scanning circuit 20 outputs a control signal SEL to a signal line connected to the gate of the select transistor M6. The vertical scanning circuit 20 outputs a control signal OFG to a signal line connected to the gate of the charge discharging transistor M7. When each transistor is formed of an n-channel transistor, the corresponding transistor is turned on when a high-level control signal is supplied from the vertical scanning circuit 20, and the corresponding transistor is turned off when a low-level control signal is supplied from the vertical scanning circuit 20.

The photoelectric conversion unit PD converts (photoelectrically converts) incident light into charge of an amount corresponding to an amount of the incident light, and accumulates the generated charge. The transfer transistor M1L has a function as a transfer unit that performs a transfer operation of transferring the charge held in the photoelectric conversion unit PD to the charge holding portion MEM1_L by turning on. The transfer transistor M2L has a function as a transfer unit that performs a transfer operation of transferring the charge held in the charge holding portion MEM1_L to the charge holding portion MEM2_L by turning on. The transfer transistor M3L has a function as a transfer unit that performs a transfer operation of transferring the charge held in the charge holding portion MEM2_L to the floating diffusion FD by turning on. The transfer transistor M1S has a function as a transfer unit that performs a transfer operation of transferring the charge held in the photoelectric conversion unit PD to the charge holding portion MEM1_S by turning on. The transfer transistor M2S has a function as a transfer unit that performs a transfer operation of transferring the charge held in the charge holding portion MEM1_S to the charge holding portion MEM2_S by turning on. The transfer transistor M3S has a function as a transfer unit that performs a transfer operation of transferring the charge held in the charge holding portion MEM2_S to the floating diffusion FD by turning on. The functions and operations of the reset transistor M4, the amplifier transistor M5, the select transistor M6, and the charge discharging transistor M7 are the same as those in the first embodiment.

In the first embodiment, the charge holding portions MEM_L1, MEM_L2, MEM_S1, and MEM_S2 are connected in parallel between the photoelectric conversion unit PD and the floating diffusion FD. On the other hand, in the present embodiment, the charge holding portions MEM1_L and MEM2_L connected in series and the charge holding portions MEM1_S and MEM2_S connected in series are connected in parallel between the photoelectric conversion unit PD and the floating diffusion FD. When viewed from the output side of the pixel 12, four transfer units are connected to the floating diffusion FD in the first embodiment, whereas the number of transfer units connected to the floating diffusion FD may be reduced to two in the present embodiment. Therefore, according to the pixel configuration of the present embodiment, the capacitance of the floating diffusion FD may be made smaller than that of the first embodiment, and a circuit configuration resistant to noise may be realized.

Next, a method of driving the photoelectric conversion device according to the present embodiment will be described with reference to FIG. 6 and FIG. 7. FIG. 6 is a timing chart illustrating a scheme of driving relating to a pixel exposure operation, and FIG. 7 is a timing chart illustrating a scheme of driving relating to a pixel signal readout operation.

FIG. 6 illustrates temporal changes of the control signals GS1_L, GS1_S, GS2_L, GS2_S, and OFG respectively supplied to the transfer transistors M1L, M1S, M2L, and M2S and the charge discharging transistor M7. When each control signal is at high-level, the corresponding transistor becomes active (on-state). In the present embodiment, since the global shutter driving is performed, the driving related to the exposure operation of the pixels 12 is the same for all the pixels 12 in all the rows. Since the driving of the odd-numbered frame and the driving of the even-numbered frame are the same in the present embodiment, FIG. 6 illustrates only the driving of one frame (N-th frame).

Also in the present embodiment, in each frame, a plurality of times (Ks times) of accumulation periods Ts and a plurality of times (Kl times) of accumulation periods Tl are executed. The accumulation periods Ts are periods for accumulating signal charge in the charge holding portion MEM1_S, and the accumulation periods Tl are periods for accumulating signal charge in the charge holding portion MEM1_L. Hereinafter, the operations of the i-th accumulation period $Ts_i$, the (i+1)-th accumulation period $Ts_{i+1}$ and the Ks-th accumulation period $Ts_{Ks}$ out of Ks times and the j-th accumulation period $Tl_j$ and the (j+1)-th accumulation period $Tl_{j+1}$ out of Kl times will be described with reference to FIG. 6. Here, i is an integer of 1 to Ks−2. J is an integer of 1 to Kl−1. The number of times Ks and Kl may be appropriately set according to a total accumulation time or the like in one frame period, and the number of times Ks and Kl may be the same or different.

It is assumed that the control signal OFG is at high-level immediately before time t10. The charge discharging transistor M7 is turned on in response to the high-level control signal OFG, and the photoelectric conversion unit PD is reset to a potential corresponding to the voltage VDD.

At the time t10, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Ts_i$ in the photoelectric conversion unit PD. The signal charge generated by the incidence of photons into the photoelectric conversion unit PD while the charge discharging transistor M7 is off is accumulated in the photoelectric conversion unit PD.

During a period from a predetermined timing after the time t10 to time t11, the vertical scanning circuit 20 controls the control signal GS1_S to high-level. As a result, the transfer transistor M1S is turned on, and the signal charge accumulated in the photoelectric conversion unit PD is transferred to the charge holding portion MEM1_S. The time t11 when the transfer transistor M1S is turned off is an end time of the accumulation period $Ts_i$ in the photoelectric conversion unit PD. That is, the period from the time t10 to the time t11 is the accumulation period $Ts_i$ of the signal charge.

After the time t11, the vertical scanning circuit 20 controls the control signal OFG from low-level to high-level. As a result, the charge discharging transistor M7 is turned on, and the photoelectric conversion unit PD is reset to a potential corresponding to the voltage VDD.

At subsequent time t12, the vertical scanning circuit 20 controls the control signal OFG from high-level to low-level. Thereby, the charge discharging transistor M7 is turned off, and the reset state of the photoelectric conversion unit PD is released. That is, the timing at which the control signal OFG transits from high-level to low-level is a start time of the accumulation period $Tl_j$ in the photoelectric conversion unit PD. The signal charge generated by the incidence of photons into the photoelectric conversion unit PD while the charge discharging transistor M7 is off is accumulated in the photoelectric conversion unit PD.

During a period from a predetermined timing after the time t12 to time t13, the vertical scanning circuit 20 controls the control signal GS1_L to high-level. As a result, the transfer transistor M1L is turned on, and the signal charge accumulated in the photoelectric conversion unit PD is transferred to the charge holding portion MEM1_L. The time t13 when the transfer transistor M1L is turned off is an end time of the accumulation period $Tl_j$ in the photoelectric conversion unit PD. That is, the period from the time t12 to the time t13 is the accumulation period $Tl_j$ of the signal charge.

Next, similarly to the period from the time t10 to the time t13, the accumulation period Ts and the accumulation period Tl are repeatedly performed a predetermined number of times. For example, as illustrated in FIG. 6, the accumulation period $Ts_{i+1}$ is performed during a period from time t14 to time t15, the accumulation period $Tl_{j+1}$ is performed during a period from time t16 to time t17, and the accumulation period $Ts_{Ks}$ is performed during a period from time t18 to time t19.

In this manner, in each frame, the Ks-number of accumulation periods Ts and the Kl-number of accumulation periods Tl are executed. As a result, the charge holding portion MEM1_S holds the signal charge generated by the photoelectric conversion unit PD during the accumulation period Tshort of the total length of the Ks-number of periods from the accumulation period $Ts_i$ to the accumulation period $Ts_{Ks}$. The charge holding portion MEM1_L holds the signal charge generated by the photoelectric conversion unit PD during the accumulation period Tlong of the total length of the Kl-number of periods from the accumulation period $Tl_1$ to the accumulation period $Tl_{Kl}$.

The signal charges accumulated in the charge holding portions MEM1_S and MEM1_L may be transferred to the charge holding portions MEM2_S and MEM2_L after the readout of the pixel signals based on the signal charges of the (N−1)-th frame accumulated in the charge holding portions MEM2_S and MEM2_L are completed. Here, it is assumed that the readout of the pixel signals based on the signal charges of the (N−1)-th frame accumulated in the charge holding portions MEM2_S and MEM2_L has been completed until time t19.

Thereafter, during a period from a predetermined timing after the time t19 to time t20, the vertical scanning circuit 20 controls the control signal GS2_L to high-level. As a result, the transfer transistor M2L is turned on, and the signal charge accumulated in the charge holding portion MEM1_L is transferred to the charge holding portion MEM2_L.

During a period from a predetermined timing after the time t19 to time t21, the vertical scanning circuit 20 controls the control signal GS2_S to high-level. As a result, the transfer transistor M2S is turned on, and the signal charge accumulated in the charge holding portion MEM1_S is transferred to the charge holding portion MEM2_S.

Although the charge transfer from the charge holding portion MEM1_L to the charge holding portion MEM2_L and the charge transfer from the charge holding portion MEM1_S to the charge holding portion MEM2_S are performed at different timings, they may be performed simultaneously. When the charge transfer from the charge holding portions MEM1_L and MEM1_S to the charge holding portions MEM2_L and MEM2_S is finished, the charge holding portions MEM1_L and MEM1_S are in an empty state. Thereby, the signal charges of the next frame (the (N+1)-th frame) may be accumulated in the charge holding portions MEM1_L and MEM1_S.

FIG. 7 illustrates temporal changes of the control signals TX_L, TX_S, SEL, and RES supplied to the transfer transistors M3L and M3S, the select transistor M6, and the reset transistor M4. When each control signal is at high-level, the corresponding transistor becomes active (on-state). Here, the pixel signal readout operation is sequentially executed for each row. FIG. 7 illustrates the control signals supplied to the pixels 12 in the n-th row and the control signals supplied to the pixels 12 in the (n+1)-th row among the control signals corresponding to the plurality of rows constituting the pixel unit 10. The control signals supplied to the pixels 12 of the n-th row are labeled by adding (n) to the reference numerals thereof, and the control signals supplied to the pixels 12 of the (n+1)-th row are labeled by adding (n+1) to the reference numerals thereof.

In each frame, the signals based on the signal charge accumulated in the charge holding portions MEM2_L and MEM2_S of the pixels 12 of each row are sequentially read out for each row. At the start time of the N-th frame, the signal charges accumulated during the accumulation periods Tlong and Tshort of the (N−1)-th frame are held in the charge holding portions MEM2_L and MEM2_S of the respective pixels 12, respectively.

It is assumed that the control signals TX_L(n), TX_S(n), and SEL(n) are at low-level, and the control signal RES(n) is at high-level immediately before time t30.

At the time t30, the vertical scanning circuit 20 controls the control signal SEL(n) from low-level to high-level. As a result, the select transistor M6 of each of the pixels 12 of the n-th row is turned on, and the amplifier transistor M5 of the pixel 12 of each column of the n-th row is connected to the vertical output line 16 of the corresponding column via the select transistor M6, so that the pixel signal may be read out. At this time, the reset transistor M4 is on-state, and the floating diffusion FD is reset to a potential corresponding to the voltage VDD. Thereby, a signal corresponding to the reset potential of the floating diffusion FD is output to the vertical output line 16.

At subsequent time t31, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t32 to time t33, the vertical scanning circuit 20 controls the control signal TX_L(n) from low-level to high-level. As a result, the transfer transistor M3L of each of the pixels 12 of the n-th row is turned on, and the signal charge held in the charge holding portion MEM2_L is transferred to the floating diffusion FD. Then, the floating diffusion FD has a potential corresponding to an amount of signal charge transferred from the charge holding portion MEM2_L, and a voltage corresponding to the potential of the floating diffusion FD is output to the vertical output line 16. The voltage of the vertical output line 16 settled after the transfer transistor M3L turns off at time t33 is a signal level voltage VSIG of the pixel 12. Thus, the signal level voltage VSIG of the pixel 12 based on the signal charge held in the charge holding portion MEM_L2 is read out to the vertical output line 16.

The difference between the reset level voltage VRES and the signal level voltage VSIG obtained in this manner, i.e., |VSIG−VRES|, is a physical quantity corresponding to the amount of signal charge held in the charge holding portion MEM2_L.

At subsequent time t34, the vertical scanning circuit 20 controls the control signal RES(n) from low-level to high-level. Accordingly, the reset transistor M4 of the pixel 12 of the n-th row is turned on, and the floating diffusion FD is reset to a potential corresponding to the voltage VDD. A signal corresponding to the reset potential of the floating diffusion FD is output to the vertical output line 16.

At subsequent time t35, the vertical scanning circuit 20 controls the control signal RES(n) from high-level to low-level. Thereby, the reset transistor M4 is turned off, and the reset state of the floating diffusion FD is released. The voltage of the vertical output line 16 settled after the reset transistor M4 is turned off is a reset level voltage VRES of the pixel 12. Thus, the reset level voltage VRES of the pixel 12 is read out to the vertical output line 16.

During a period from subsequent time t36 to time t37, the vertical scanning circuit 20 controls the control signal TX_S(n) from low-level to high-level. As a result, the transfer transistor M3S of each of the pixels 12 of the n-th row is turned on, and the signal charge held in the charge holding portion MEM2_S is transferred to the floating diffusion FD. Then, the floating diffusion FD has a potential corresponding to an amount of signal charge transferred from the charge holding portion MEM2_S, and a voltage corresponding to the potential of the floating diffusion FD is output to the vertical output line 16. The voltage of the vertical output line 16 settled after the transfer transistor M3S turns off at time t37 is a signal level voltage VSIG of the pixel 12. Thus, the signal level voltage VSIG of the pixel 12 based on the signal charge held in the charge holding portion MEM2_S is read out to the vertical output line 16.

The difference between the reset level voltage VRES and the signal level voltage VSIG obtained in this manner, i.e., the difference |VSIG−VRES| becomes a physical quantity corresponding to the amount of signal charge held in the charge holding portion MEM_S2.

At subsequent time t38, the vertical scanning circuit 20 controls the control signal RES(n) from low-level to high-level. Accordingly, the reset transistor M4 of the pixel 12 of the n-th row is turned on, and the floating diffusion FD is reset to a potential corresponding to the voltage VDD.

At subsequent time t39, the vertical scanning circuit 20 controls the control signal SEL(n) from high-level to low-level. Thereby, the select transistor M6 of each of the pixels 12 of the n-th row is turned off, and the selection of the n-th row is released.

In a period from the time t39 to subsequent time t40, similarly to the period from the time t30 to the time t39, signals based on the signal charges accumulated in the charge holding portion MEM2_L and the charge holding portion MEM2_S are read out from each of the pixels 12 in the (n+1)-th row. The same applies to the readout operation of the pixels 12 in the other rows.

In the driving examples described with reference to FIG. 6 and FIG. 7, the length of the accumulation period Tlong and the length of the accumulation period Tshort may be the same, but are preferably different. By changing the length of the accumulation period Tlong and the length of the accumulation period Tshort, two kinds of images with different effective exposure amounts may be acquired in the same frame. An image having a wide dynamic range may be obtained by correcting one of the two types of images acquired in this manner according to the ratio of the length of the accumulation period and combining the signals of the other image with one image.

Also in the present embodiment, the accumulation period Tshort is divided into the Ks-number of accumulation periods Ts, and the accumulation period Tlong is divided into the Kl-number of accumulation periods Tl, and these periods are alternately executed. By configuring the accumulation periods in this manner, the time region each of which the signal charge is acquired may be suppressed from being biased in the frame and may be dispersed in the frame. As a result, as compared with the case where each of the accumulation period Tshort and the accumulation period Tlong is executed in one continuous period, it is possible to suppress image rattling between frames at the time of moving image shooting. In particular, it is possible to obtain a significant effect when photographing an object moving in the screen at high speed or a flashing light source. Further, a position of a temporal centroid of the accumulation period Tshort and a position of a temporal centroid of the accumulation period Tlong may be brought close to each other, and a composite image of good quality may be acquired.

In addition, the pixel 12 of the photoelectric conversion device according to the present embodiment includes a charge holding portion for holding the signal charge of a previous frame in addition to the charge holding portion for accumulating the signal charge. Accordingly, the signal readout operation may be performed even in a period in which the signal charge is accumulated, and time regions in which the signal charge cannot be acquired may be reduced in each frame period, whereby a seamless moving image may be acquired.

As described above, according to the present embodiment, it is possible to acquire moving images of high quality and high dynamic range.

Third Embodiment

Figure 8:
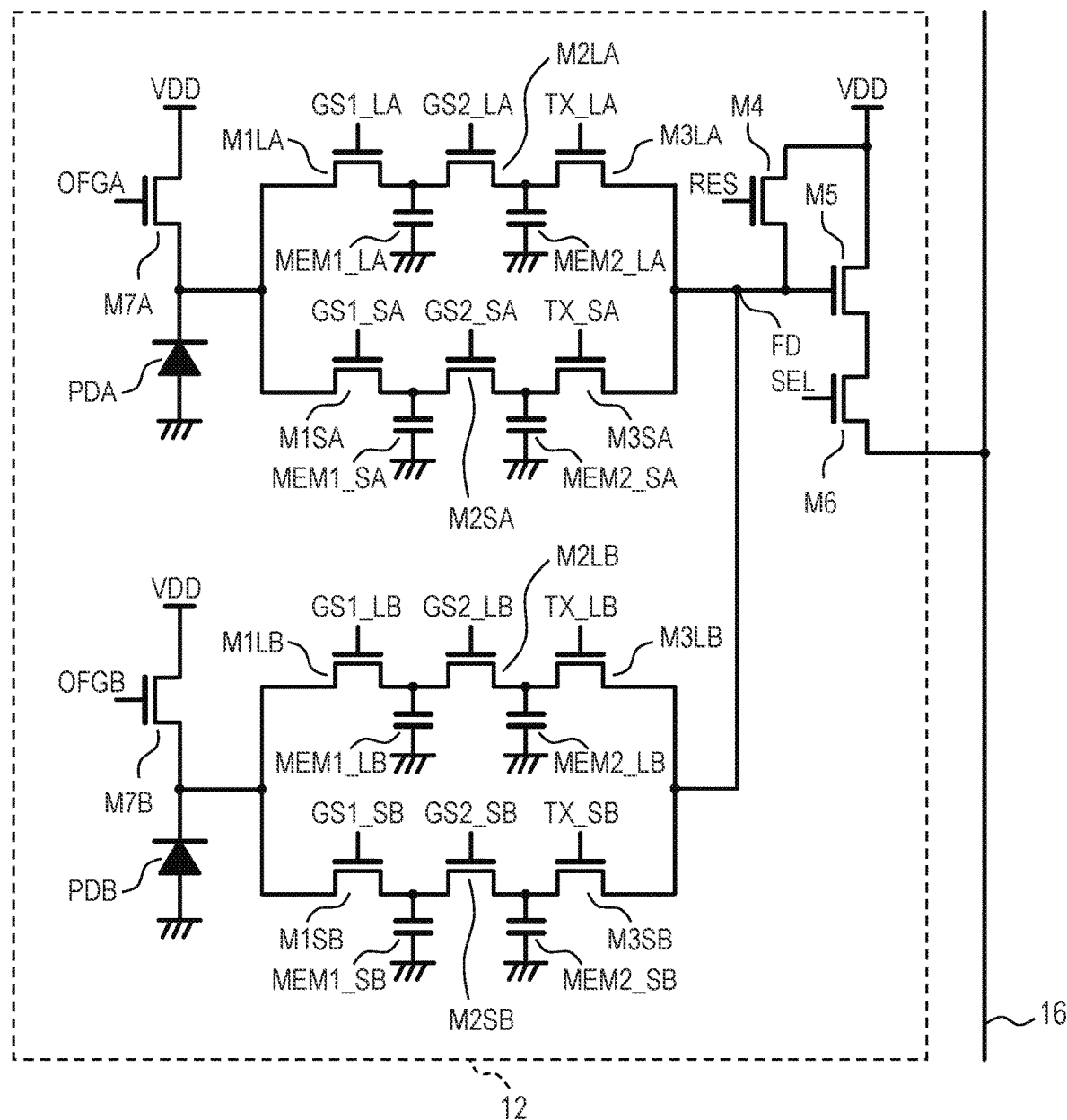
FIG. 8 is an equivalent circuit diagram illustrating a configuration example of a pixel of a photoelectric conversion device according to a third embodiment of the present invention.
Figure 9A:
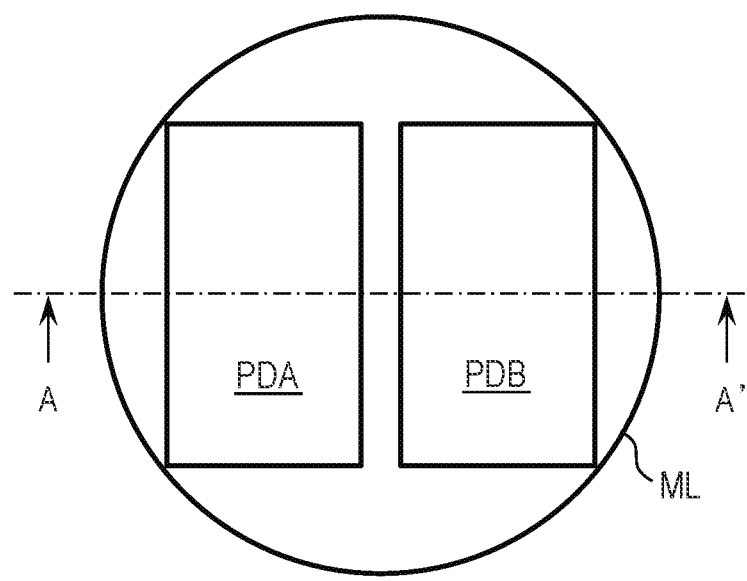
FIG. 9A and FIG. 9B are schematic diagrams illustrating an arrangement example of two photoelectric conversion units included in one pixel.
Figure 9B:
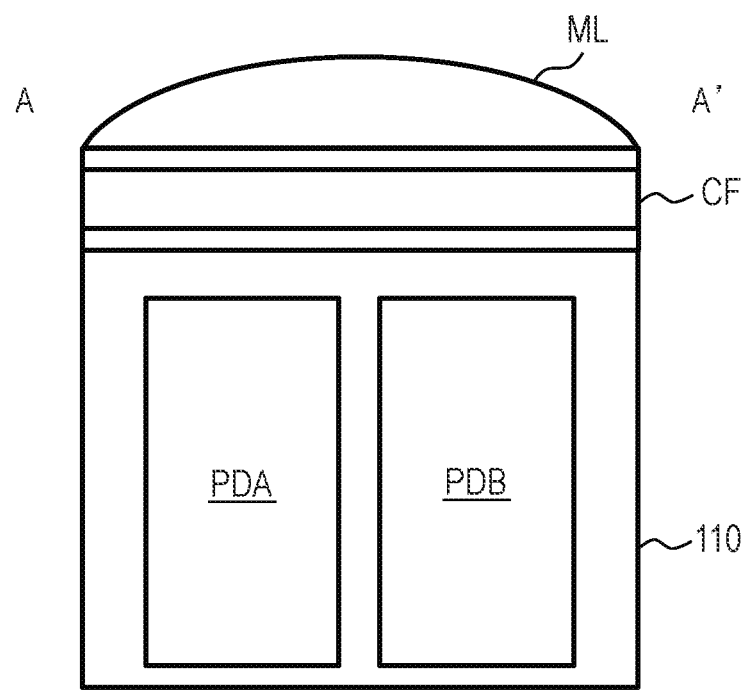

A photoelectric conversion device and a method of driving the same according to a third embodiment of the present invention will be described with reference to FIG. 8 to FIG. 9B. Components similar to those of the photoelectric conversion device according to the first or second embodiment are denoted by the same reference numerals, and description thereof will be omitted or simplified. FIG. 8 is an equivalent circuit diagram illustrating a configuration example of a pixel of the photoelectric conversion device according to the present embodiment. FIG. 9A and FIG. 9B are schematic diagrams illustrating an arrangement example of two photoelectric conversion units included in one pixel.

The photoelectric conversion device according to the present embodiment is the same as the photoelectric conversion device according to the first or second embodiment except that the configuration of the pixel 12 is different. In the present embodiment, differences from the photoelectric conversion device according to the first or second embodiment will be mainly described, and description of the same portions as those of the photoelectric conversion device according to the first or second embodiment will be appropriately omitted.

Each pixel 12 in the photoelectric conversion device according to the present embodiment includes two sets of circuit blocks similar to the circuit block of the second embodiment including the photoelectric conversion unit PD, the transfer transistors M1L, M1S, M2L, M2S, M3L, and M3S, and the charge discharging transistor M7. That is, as illustrated in FIG. 8, the pixel 12 according to the present embodiment includes a first circuit block including a photoelectric conversion unit PDA, transfer transistors M1LA, M1SA, M2LA, M2SA, M3LA, and M3SA, and a charge discharging transistor M7A.

The pixel 12 according to the present embodiment further includes a second circuit block including a photoelectric conversion unit PDB, transfer transistors M1LB, M1SB, M2LB, M2SB, M3LB, and M3SB, and a charge discharging transistor M7B.

The photoelectric conversion unit PDA has an anode connected to a ground node, and a cathode connected to a source of the transfer transistor M1LA, a source of the transfer transistor M1SA, and a source of the charge discharging transistor M7A. A drain of the transfer transistor M1LA is connected to a source of the transfer transistor M2LA. A connection node between the drain of the transfer transistor M1LA and the source of the transfer transistor M2LA includes a capacitance component and functions as a charge holding portion (charge holding portion MEM1_LA). A drain of the transfer transistor M2LA is connected to a source of the transfer transistor M3LA. A connection node between the drain of the transfer transistor M2LA and the source of the transfer transistor M3LA includes a capacitance component and functions as a charge holding portion (charge holding portion MEM2_LA). A drain of the transfer transistor M1SA is connected to a source of the transfer transistor M2SA. A connection node between the drain of the transfer transistor M1SA and the source of the transfer transistor M2SA includes a capacitance component and functions as a charge holding portion (charge holding portion MEM1_SA). A drain of the transfer transistor M2SA is connected to a source of the transfer transistor M3SA. A connection node between the drain of the transfer transistor M2SA and the source of the transfer transistor M3SA includes a capacitance component and functions as a charge holding portion (charge holding portion MEM2_SA).

The photoelectric conversion unit PDB has an anode connected to the ground node, and a cathode connected to a source of the transfer transistor M1LB, a source of the transfer transistor M1SB, and a source of the charge discharging transistor M7B. A drain of the transfer transistor M1LB is connected to a source of the transfer transistor M2LB. A connection node between the drain of the transfer transistor M1LB and the source of the transfer transistor M2LB includes a capacitance component and functions as a charge holding portion (charge holding portion MEM1_LB). A drain of the transfer transistor M2LB is connected to a source of the transfer transistor M3LB. A connection node between the drain of the transfer transistor M2LB and the source of the transfer transistor M3LB includes a capacitance component and functions as a charge holding portion (charge holding portion MEM2_LB). A drain of the transfer transistor M1SB is connected to a source of the transfer transistor M2SB. A connection node between the drain of the transfer transistor M1SB and the source of the transfer transistor M2SB includes a capacitance component and functions as a charge holding portion (charge holding portion MEM1_SB). A drain of the transfer transistor M2SB is connected to a source of the transfer transistor M3SB. A connection node between the drain of the transfer transistor M2SB and the source of the transfer transistor M3SB includes a capacitance component and functions as a charge holding portion (charge holding portion MEM2_SB).

The drains of the transfer transistors M3LA, M3SA, M3LB, and M3SB are connected to a source of the reset transistor M4 and a gate of the amplifier transistor M5. The connection nodes of the drains of the transfer transistors M3LA, M3SA, M3LB, and M3SB, the source of the reset transistor M4, and the gate of the amplifier transistor M5 are so-called floating diffusions FD. The floating diffusion FD includes a capacitance component (floating diffusion capacitance) and functions as a charge holding portion.

A drain of the reset transistor M4, a drain of the amplifier transistor M5, and a drain of the charge discharging transistor M7 are connected to a power supply voltage line (voltage VDD). A source of the amplifier transistor M5 is connected to a drain of the select transistor M6. A source of the select transistor M6 is connected to the vertical output line 16.

Each of the control lines 14 may include sixteen signal lines connected to each of the gates of the transfer transistors M1LA, M1SA, M1LB, M1SB, M2LA, M2SA, M2LB, M2SB, M3LA, M3 SA, M3LB, M3 SB, the reset transistor M4, the select transistor M6, and the charge discharging transistors M7A, M7B.

The vertical scanning circuit 20 outputs a control signal GS1_LA to a signal line connected to a gate of the transfer transistor M1LA. The vertical scanning circuit 20 outputs a control signal GS2_LA to a signal line connected to a gate of the transfer transistor M2LA. The vertical scanning circuit 20 outputs a control signal TX_LA to a signal line connected to a gate of the transfer transistor M3LA. The vertical scanning circuit 20 outputs a control signal GS1_SA to a signal line connected to a gate of the transfer transistor M1SA. The vertical scanning circuit 20 outputs a control signal GS2_SA to a signal line connected to a gate of the transfer transistor M2SA. The vertical scanning circuit 20 outputs a control signal TX_SA to a signal line connected to a gate of the transfer transistor M3SA. The vertical scanning circuit 20 outputs a control signal OFGA to a signal line connected to a gate of the charge discharging transistor M7A.

The vertical scanning circuit 20 outputs a control signal GS1_LB to a signal line connected to a gate of the transfer transistor M1LB. The vertical scanning circuit 20 outputs a control signal GS2_LB to a signal line connected to a gate of the transfer transistor M2LB. The vertical scanning circuit 20 outputs a control signal TX_LB to a signal line connected to a gate of the transfer transistor M3LB. The vertical scanning circuit 20 outputs a control signal GS1_SB to a signal line connected to a gate of the transfer transistor M1SB. The vertical scanning circuit 20 outputs a control signal GS2_SB to a signal line connected to a gate of the transfer transistor M2SB. The vertical scanning circuit 20 outputs a control signal TX_SB to a signal line connected to a gate of the transfer transistor M3SB. The vertical scanning circuit 20 outputs a control signal OFGB to a signal line connected to a gate of the charge discharging transistor M7B. The vertical scanning circuit 20 outputs a control signal RES to a signal line connected to a gate of the reset transistor M4. The vertical scanning circuit 20 outputs a control signal SEL to a signal line connected to a gate of the select transistor M6.

Note that some of the corresponding transistors of the first circuit block and the second circuit block may be connected to a common signal line. In this case, each of the control lines 14 may include 11 signal lines. That is, the same control signal may be supplied to the gate of the transfer transistor M1LA and the gate of the transfer transistor M1LB via a common signal line. Similarly, the same control signal may be supplied to the gate of the transfer transistor M1SA and the gate of the transfer transistor M1SB via a common signal line. The same control signal may be supplied to the gate of the transfer transistor M2LA and the gate of the transfer transistor M2LB via a common signal line. The same control signal may be supplied to the gate of the transfer transistor M2SA and the gate of the transfer transistor M2SB via a common signal line. The same control signal may be supplied to the gate of the charge discharging transistor M7A and the gate of the charge discharging transistor M7B via a common signal line. With this configuration, it is possible to ensure the simultaneousness of signals acquired by the two photoelectric conversion units PDA and PDB.

The functions and operations of the first circuit block and the second circuit block described above are similar to those of the second embodiment. The functions and operations of the reset transistor M4, the amplifier transistor M5, the select transistor M6, and the charge discharging transistor M7 are the same as those in the first embodiment.

FIG. 9A and FIG. 9B are schematic diagrams illustrating an arrangement example of the photoelectric conversion unit PDA and the photoelectric conversion unit PDB constituting one pixel 12. FIG. 9A is a top view, and FIG. 9B is a cross-sectional view taken along line A-A' of FIG. 9A. The photoelectric conversion unit PDA and the photoelectric conversion unit PDB are provided in a semiconductor layer 110 together with each transistor (not illustrated) constituting the pixel 12. A microlens ML is disposed above the semiconductor layer 110 with a color filter layer CF interposed therebetween. As illustrated in FIG. 9A and FIG. 9B, the photoelectric conversion unit PDA and the photoelectric conversion unit PDB constituting one pixel 12 share one microlens ML. In other words, the photoelectric conversion units PDA and PDB are configured to receive light that has passed through different pupil regions among light incident on an imaging optical system. That is, the microlens ML condenses the light that has passed through a first pupil area among an exit pupil of an imaging lens on the photoelectric conversion unit PDA, and condenses the light that has passed through a second pupil area different from the first pupil area on the photoelectric conversion unit PDB. With this configuration, a signal (A image signal) based on charge generated by the photoelectric conversion unit PDA and a signal (B image signal) based on charge generated by the photoelectric conversion unit PDB may be used as a phase difference detection signal for distance measurement. A signal (A+B image signal) based on the total charge generated by the photoelectric conversion units PDA and PDB may be used as a signal for image generation.

As described above, according to the present embodiment, it is possible to acquire moving images of high quality and high dynamic range. Further, according to the present embodiment, phase difference detection may be performed based on the output signals of the two circuit blocks of each pixel 12, and acquisition of distance information to an object, focusing of a lens, and the like may be performed.

Fourth Embodiment

Figure 10:
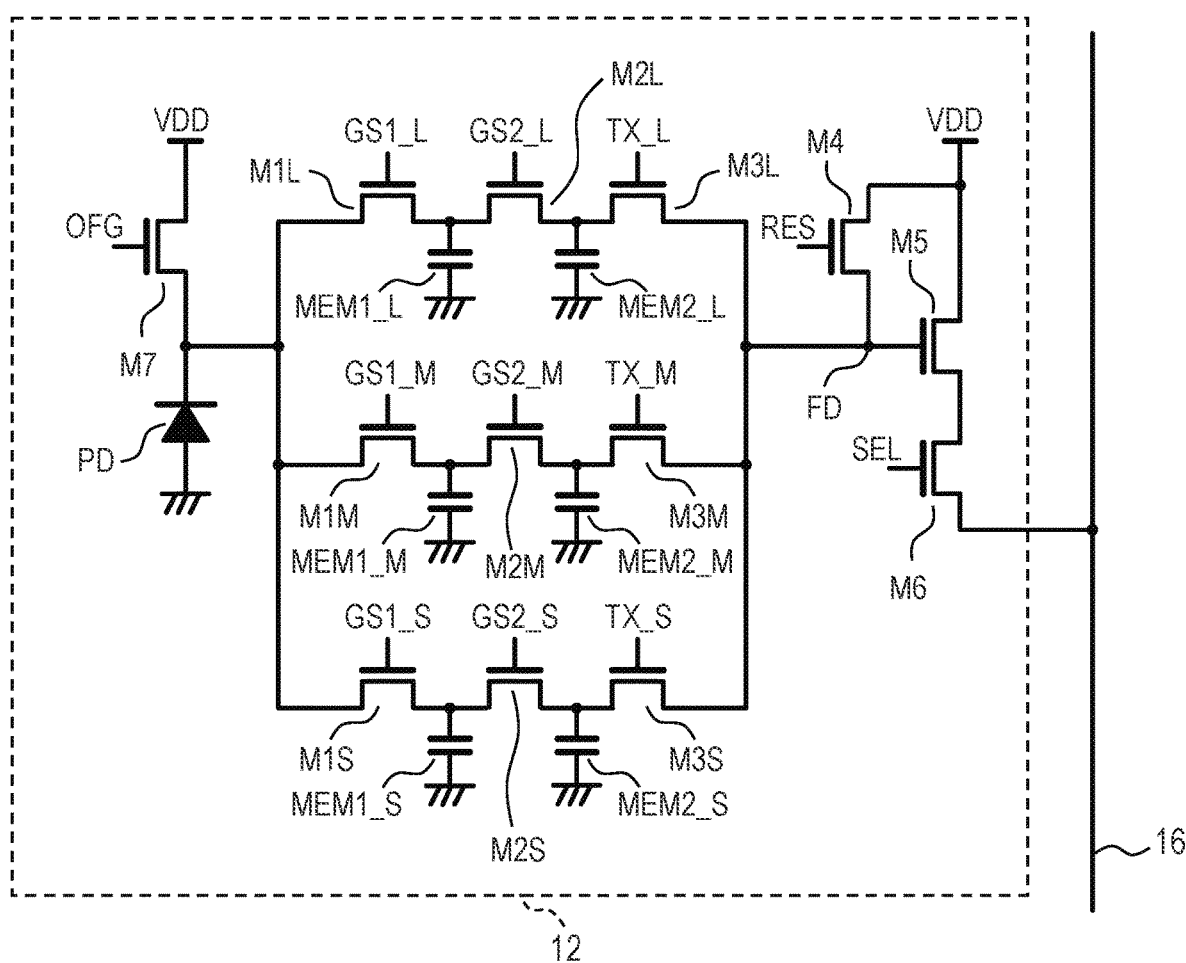
FIG. 10 is an equivalent circuit diagram illustrating a configuration example of a pixel of a photoelectric conversion device according to a fourth embodiment of the present invention.

A photoelectric conversion device and a method of driving the same according to a fourth embodiment of the present invention will be described with reference to FIG. 10. Components similar to those of the photoelectric conversion devices according to the first to third embodiments are denoted by the same reference numerals, and description thereof will be omitted or simplified. FIG. 10 is an equivalent circuit diagram illustrating a configuration example of a pixel of the photoelectric conversion device according to the present embodiment.

The photoelectric conversion device according to the present embodiment is the same as the photoelectric conversion devices according to the first to third embodiments except that the configuration of the pixel 12 is different. In the present embodiment, differences from the photoelectric conversion devices according to the first to third embodiments will be mainly described, and description of the same portions as those of the photoelectric conversion devices according to the first to third embodiments will be appropriately omitted.

As illustrated in FIG. 10, each pixel 12 in the photoelectric conversion device according to the present embodiment further includes transfer transistors M1M, M2M, and M3M in addition to the components of the pixel 12 of the second embodiment illustrated in FIG. 5. A source of the transfer transistor M1M is connected to the cathode of the photodiode of the photoelectric conversion unit PD and the source of the charge discharging transistor M7. A drain of the transfer transistor M1M is connected to a source of the transfer transistor M2M. A connection node between the drain of the transfer transistor M1M and the source of the transfer transistor M2M includes a capacitance component and functions as a charge holding portion (charge holding portion MEM1_M). A drain of the transfer transistor M2M is connected to a source of the transfer transistor M3M. A connection node between the drain of the transfer transistor M2M and the source of the transfer transistor M3M includes a capacitance component and functions as a charge holding portion (charge holding portion MEM2_M). A drain of the transfer transistor M3M is connected to the source of the reset transistor M4 and the gate of the amplifier transistor M5. The connection relationship of the other components of the pixel 12 is the same as that described in the second embodiment.

Each of the control lines 14 further includes three signal lines connected to each of the transfer transistors M1M, M2M, and M3M. The vertical scanning circuit 20 outputs a control signal GS1_M to a signal line connected to a gate of the transfer transistor M1M. The vertical scanning circuit 20 outputs a control signal GS2_M to a signal line connected to a gate of the transfer transistor M2M. The vertical scanning circuit 20 outputs a control signal TX_M to a signal line connected to a gate of the transfer transistor M3M. When each transistor is formed of an n-channel transistor, the corresponding transistor is turned on when a high-level control signal is supplied from the vertical scanning circuit 20, and the corresponding transistor is turned off when a low-level control signal is supplied from the vertical scanning circuit 20.

The transfer transistor M1M has a function as a transfer unit that performs a transfer operation of transferring the charge held in the photoelectric conversion unit PD to the charge holding portion MEM1_M by turning on. The transfer transistor M2M has a function as a transfer unit that performs a transfer operation of transferring the charge held in the charge holding portion MEM1_M to the charge holding portion MEM2_M by being turned on. The transfer transistor M3M has a function as a transfer unit that performs a transfer operation of transferring the charge held in the charge holding portion MEM2_M to the floating diffusion FD by turning on. The operation of the other components of the pixel 12 is the same as that described in the second embodiment.

In the second embodiment, the two charge holding portions MEM1_L and MEM1_S are connected in parallel to one photoelectric conversion unit PD via the transfer transistors M1L and M1S, respectively. On the other hand, in the present embodiment, the three charge holding portions MEM1_L, MEM1_M, and MEM1_S are connected in parallel to one photoelectric conversion unit PD via the transfer transistors M1L, M1M, and M1S, respectively. Therefore, according to the present embodiment, it is possible to acquire three kinds of images based on signal charges accumulated during different accumulation times during one frame period. By compositing the three kinds of images acquired in this manner, the dynamic range may be further enlarged as compared with the second embodiment.

In the present embodiment, the charge holding portions MEM2_L, MEM2_M, and MEM2_S are connected to the charge holding portions MEM1_L, MEM1_M, and MEM1_S via the transfer transistors M2L, M2M, and M2S, respectively. That is, the pixel 12 includes the charge holding portions MEM2_L, MEM2_M, and MEM2_S capable of holding charges separately from the charge holding portions MEM1_L, MEM1_M, and MEM1_S used for holding signal charges. Thus, in the present embodiment, the signal charges of the next frame may be accumulated while the signal charges of the previous frame are held. As a result, signal readout may be performed even in a period in which the signal charges are accumulated, time regions in which the signal charge cannot be acquired may be reduced in each frame period, whereby a seamless moving image may be acquired.

Although three charge holding portions are connected in parallel to one photoelectric conversion unit PD in the present embodiment, four or more charge holding portions may be connected in parallel. With this configuration, the dynamic range may be further enlarged.

As described above, according to the present embodiment, it is possible to acquire moving images of high quality and high dynamic range.

Fifth Embodiment

Figure 11:
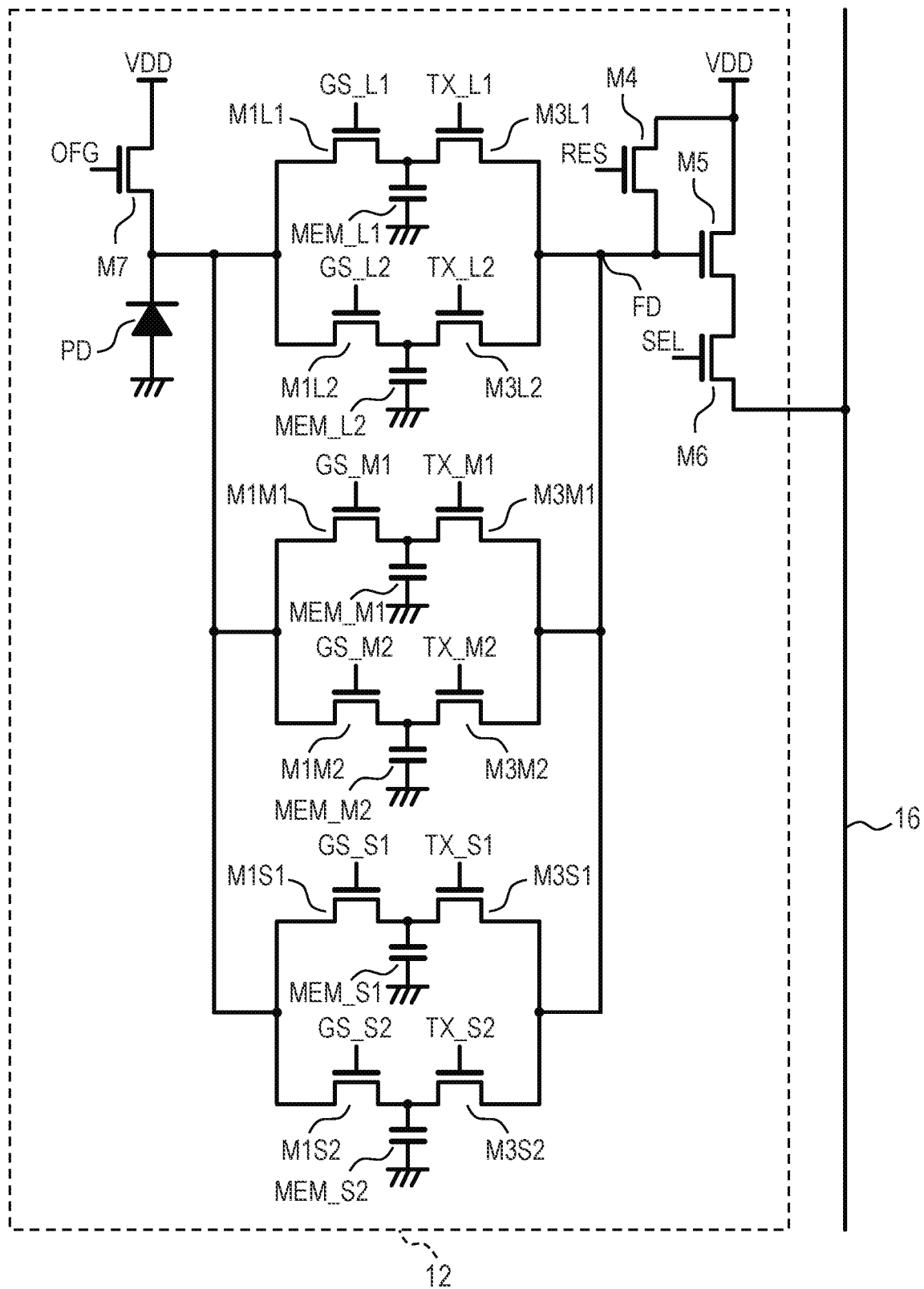
FIG. 11 is an equivalent circuit diagram illustrating a configuration example of a pixel of a photoelectric conversion device according to a fifth embodiment of the present invention.

A photoelectric conversion device and a method of driving the same according to a fifth embodiment of the present invention will be described with reference to FIG. 11. Components similar to those of the photoelectric conversion devices according to the first to fourth embodiments are denoted by the same reference numerals, and description thereof will be omitted or simplified. FIG. 11 is an equivalent circuit diagram illustrating a configuration example of a pixel of the photoelectric conversion device according to the present embodiment.

The photoelectric conversion device according to the present embodiment is the same as the photoelectric conversion devices according to the first to fourth embodiments except that the configuration of the pixel 12 is different. In the present embodiment, differences from the photoelectric conversion devices according to the first to fourth embodiments will be mainly described, and description of the same portions as those of the photoelectric conversion devices according to the first to fourth embodiments will be appropriately omitted.

As illustrated in FIG. 11, each pixel 12 in the photoelectric conversion device according to the present embodiment further includes transfer transistors M1M1, M1M2, M3M1, and M3M2 in addition to the components of the pixel 12 of the first embodiment illustrated in FIG. 2. A source of the transfer transistor M1M1 and a source of the transfer transistor M1M2 are connected to the cathode of the photodiode of the photoelectric conversion unit PD and the source of the charge discharging transistor M7. A drain of the transfer transistor M1M1 is connected to a source of the transfer transistor M3M1. A connection node between the drain of the transfer transistor M1M1 and the source of the transfer transistor M3M1 includes a capacitance component and functions as a charge holding portion (charge holding portion MEM_M1). A drain of the transfer transistor M1M2 is connected to a source of the transfer transistor M3M2. A connection node between the drain of the transfer transistor M1M2 and the source of the transfer transistor M3M2 includes a capacitance component and functions as a charge holding portion (charge holding portion MEM_M2). A drain of the transfer transistor M3M1 and a drain of the transfer transistor M3M2 are connected to the source of the reset transistor M4 and the gate of the amplifier transistor M5. The connection relationship of the other components of the pixel 12 is the same as that described in the first embodiment.

Each of the control lines 14 further includes four signal lines connected to the transfer transistors M1M1, M1M2, M3M1, and M3M2. The vertical scanning circuit 20 outputs a control signal GS_M1 to a signal line connected to a gate of the transfer transistor M1M1. The vertical scanning circuit 20 outputs a control signal GS_M2 to a signal line connected to a gate of the transfer transistor M1M2. The vertical scanning circuit 20 outputs a control signal TX_M1 to a signal line connected to a gate of the transfer transistor M3M1. The vertical scanning circuit 20 outputs a control signal TX_M2 to a signal line connected to a gate of the transfer transistor M3M2. When each transistor is formed of an n-channel transistor, the corresponding transistor is turned on when a high-level control signal is supplied from the vertical scanning circuit 20, and the corresponding transistor is turned off when a low-level control signal is supplied from the vertical scanning circuit 20.

The transfer transistor M1M1 has a function as a transfer unit that performs a transfer operation of transferring the charge held in the photoelectric conversion unit PD to the charge holding portion MEM_M1 by turning on. The transfer transistor M1M2 has a function as a transfer unit that performs a transfer operation of transferring the charge held in the photoelectric conversion unit PD to the charge holding portion MEM_M2 by turning on. The transfer transistor M3M1 has a function as a transfer unit that performs a transfer operation of transferring the charge held in the charge holding portion MEM_M1 to the floating diffusion FD by turning on. The transfer transistor M3M2 has a function as a transfer unit that performs a transfer operation of transferring the charge held in the charge holding portion MEM_M2 to the floating diffusion FD by turning on. The operation of the other components of the pixel 12 is the same as that described in the first embodiment.

In the first embodiment, the four charge holding portions MEM_L1, MEM_L2, MEM_S1, and MEM_S2 are connected in parallel to one photoelectric conversion unit PD via the transfer transistors M1L1, M1L2, M1S1, and M1S2, respectively. On the other hand, in the present embodiment, the two charge holding portions MEM_M1 and MEM_M2 are additionally connected in parallel to the one photoelectric conversion unit PD via the transfer transistors M1M1 and M1M2, respectively. Therefore, according to the present embodiment, by using three charge holding portions, three kinds of images based on the signal charges accumulated during different accumulation times may be alternately acquired for each frame. By compositing the three kinds of images acquired in each frame in this manner, the dynamic range may be further increased as compared with the first embodiment. Further, according to this configuration, the signal readout may be performed even in a period in which the signal charges are accumulated, and time regions in which the signal charge cannot be acquired may be reduced in each frame period, whereby a seamless moving image may be acquired.

In the present embodiment, six charge holding portions are connected in parallel to one photoelectric conversion unit PD, but eight or more charge holding portions may be connected in parallel. With this configuration, the dynamic range may be further enlarged.

As described above, according to the present embodiment, it is possible to acquire moving images of high quality and high dynamic range.

Sixth Embodiment

An imaging system according to a sixth embodiment of the present invention will be described with reference to FIG. 12. FIG. 12 is a block diagram illustrating a schematic configuration of the imaging system according to the present embodiment.

The photoelectric conversion device 100 described in the first to fifth embodiments may be applied to various imaging systems. Examples of applicable imaging systems include digital still cameras, digital camcorders, surveillance cameras, copying machines, facsimiles, mobile phones, on-vehicle cameras, observation satellites, and the like. A camera module including an optical system such as a lens and an imaging device is also included in the imaging system. FIG. 12 is a block diagram of a digital still camera as an example of these.

The imaging system 200 illustrated in FIG. 12 includes an imaging device 201, a lens 202 for forming an optical image of an object on the imaging device 201, an aperture 204 for varying the amount of light passing through the lens 202, and a barrier 206 for protecting the lens 202. The lens 202 and the aperture 204 form an optical system that collects light on the imaging device 201. The imaging device 201 is the photoelectric conversion device 100 described in any of the first to fifth embodiments, and converts an optical image formed by the lens 202 into image data.

The imaging system 200 also includes a signal processing unit 208 that processes an output signal output from the imaging device 201. The signal processing unit 208 generates image data from a digital signal output from the imaging device 201. The signal processing unit 208 performs various corrections and compressions as necessary and outputs the processed image data. The imaging device 201 may include an AD conversion unit that generates a digital signal to be processed by the signal processing unit 208. The AD conversion unit may be formed in a semiconductor layer (semiconductor substrate) in which the photoelectric conversion unit of the imaging device 201 is formed, or may be formed in a semiconductor layer different from the semiconductor layer in which the photoelectric conversion unit of the imaging device 201 is formed. The signal processing unit 208 may be formed on the same semiconductor layer as the imaging device 201.

The imaging system 200 further includes a memory unit 210 for temporarily storing image data, and an external interface unit (external I/F unit) 212 for communicating with an external computer or the like. Further, the imaging system 200 includes a storage medium 214 such as a semiconductor memory for storing or reading out the imaging data, and a storage medium control interface unit (storage medium control I/F unit) 216 for storing or reading out the imaging data on or from the storage medium 214. The storage medium 214 may be built in the imaging system 200, or may be detachable.

The imaging system 200 further includes a general control/operation unit 218 that controls various calculations and operations of the entire digital still camera, and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs the imaging signal to the signal processing unit 208. The signal processing unit 208 performs predetermined signal processing on the imaging signal output from the imaging device 201, and outputs image data. The signal processing unit 208 generates an image using the imaging signal.

As described above, according to the present embodiment, it is possible to realize an imaging system to which the photoelectric conversion device 100 according to the first to fifth embodiments is applied.

Seventh Embodiment

Figure 13A:
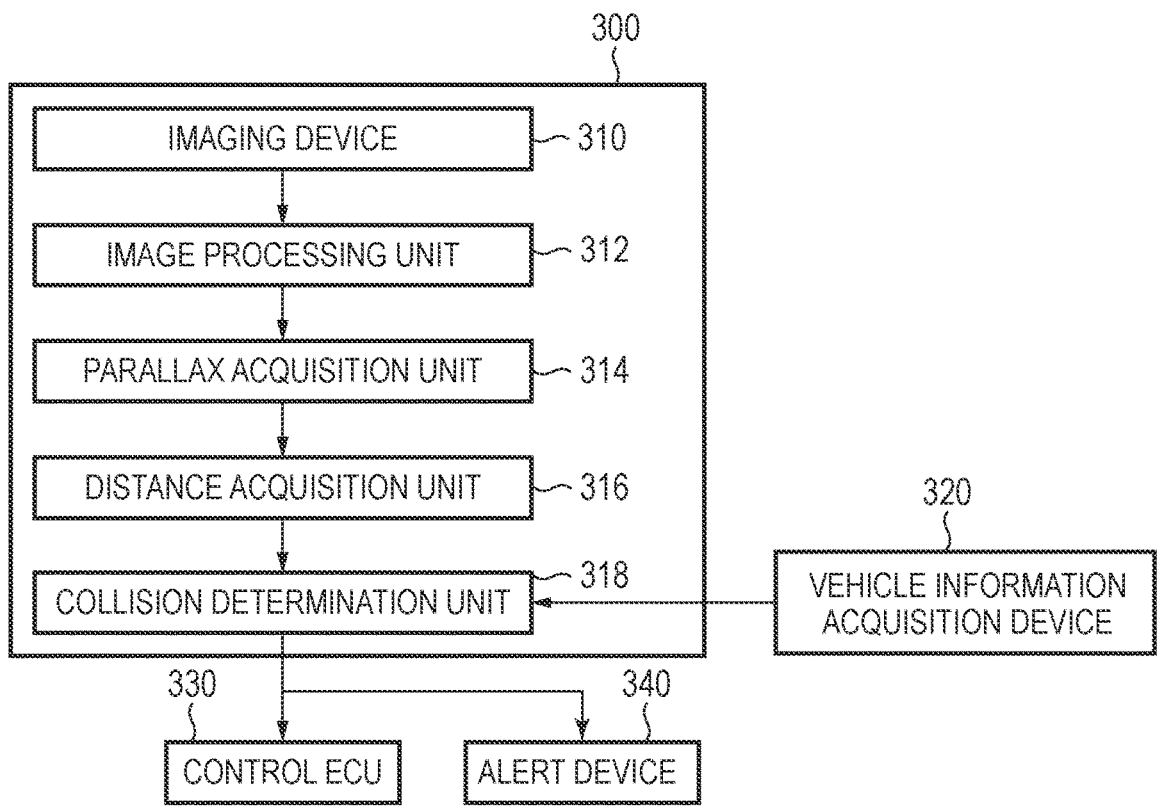
FIG. 13A is a diagram illustrating a configuration example of an imaging system according to a seventh embodiment of the present invention.
Figure 13B:
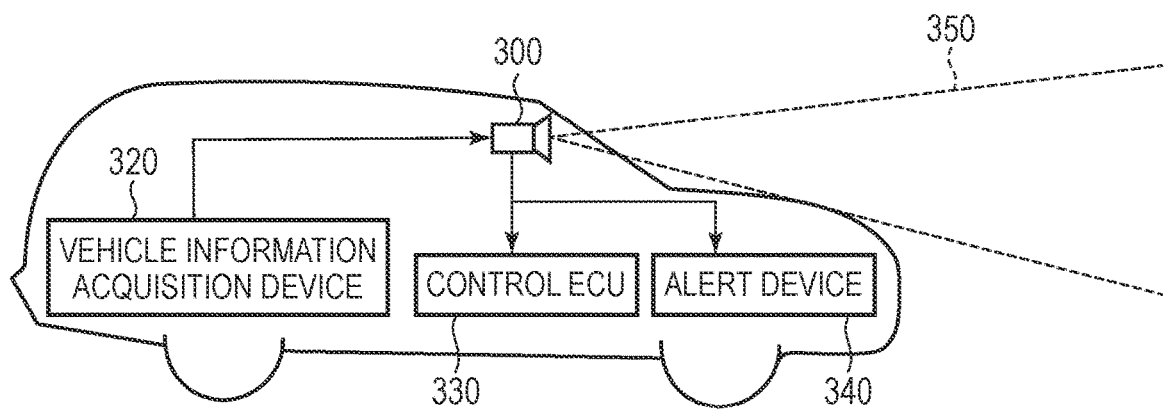
FIG. 13B is a diagram illustrating a configuration example of a movable object according to the seventh embodiment of the present invention.

An imaging system and a movable object according to a seventh embodiment of the present invention will be described with reference to FIG. 13A and FIG. 13B. FIG. 13A is a diagram illustrating a configuration of the imaging system according to the present embodiment. FIG. 13B is a diagram illustrating a configuration of the movable object according to the present embodiment.

FIG. 13A illustrates an example of an imaging system relating to an on-vehicle camera. The imaging system 300 includes an imaging device 310. The imaging device 310 is the photoelectric conversion device 100 described in any one of the first to fifth embodiments. The imaging system 300 includes an image processing unit 312 that performs image processing on a plurality of image data acquired by the imaging device 310, and a parallax acquisition unit 314 that calculates parallax (phase difference of parallax images) from the plurality of image data acquired by the imaging device 310. The imaging system 300 includes a distance acquisition unit 316 that calculates a distance to an object based on the calculated parallax, and a collision determination unit 318 that determines whether or not there is a possibility of collision based on the calculated distance. Here, the parallax acquisition unit 314 and the distance acquisition unit 316 are examples of a distance information acquisition unit that acquires distance information to the object. That is, the distance information may be information on a parallax, a defocus amount, a distance to the object, and the like. The collision determination unit 318 may determine the collision possibility using any of these pieces of distance information. The distance information acquisition unit may be implemented by dedicated hardware or software modules. Further, it may be implemented by FPGA (Field Programmable Gate Array), ASIC (Application Specific Integrated circuit), or the like, or may be implemented by a combination of these.

The imaging system 300 is connected to a vehicle information acquisition device 320, and may acquire vehicle information such as a vehicle speed, a yaw rate, and a steering angle. Further, the imaging system 300 is connected to a control ECU 330 which is a control device that outputs a control signal for generating a braking force to the vehicle based on the determination result of the collision determination unit 318. The imaging system 300 is also connected to an alert device 340 that issues an alert to the driver based on the determination result of the collision determination unit 318. For example, when the collision possibility is high as the determination result of the collision determination unit 318, the control ECU 330 performs vehicle control to avoid collision and reduce damage by braking, returning an accelerator, suppressing engine output, or the like. The alert device 340 alerts a user by sounding an alarm such as a sound, displaying alert information on a screen of a car navigation system or the like, or giving vibration to a seat belt or a steering wheel.

In the present embodiment, the imaging system 300 images the periphery of the vehicle, for example, the front or the rear. FIG. 13B illustrates an imaging system in the case of imaging an image in front of a vehicle (an imaging range 350). The vehicle information acquisition device 320 sends an instruction to the imaging system 300 or the imaging device 310. With such a configuration, the accuracy of distance measurement may be further improved.

In the above description, an example has been described in which control is performed so as not to collide with other vehicles, but the present invention is also applicable to control of automatic driving following other vehicles, control of automatic driving so as not to go out of a lane, and the like. Further, the imaging system is not limited to a vehicle such as a host vehicle, and may be applied to, for example, a movable object (moving device) such as a ship, an aircraft, or an industrial robot. In addition, the present invention may be applied not only to a movable object but also to a wide variety of equipment such as an ITS (intelligent transport systems).

Eighth Embodiment

Figure 14:
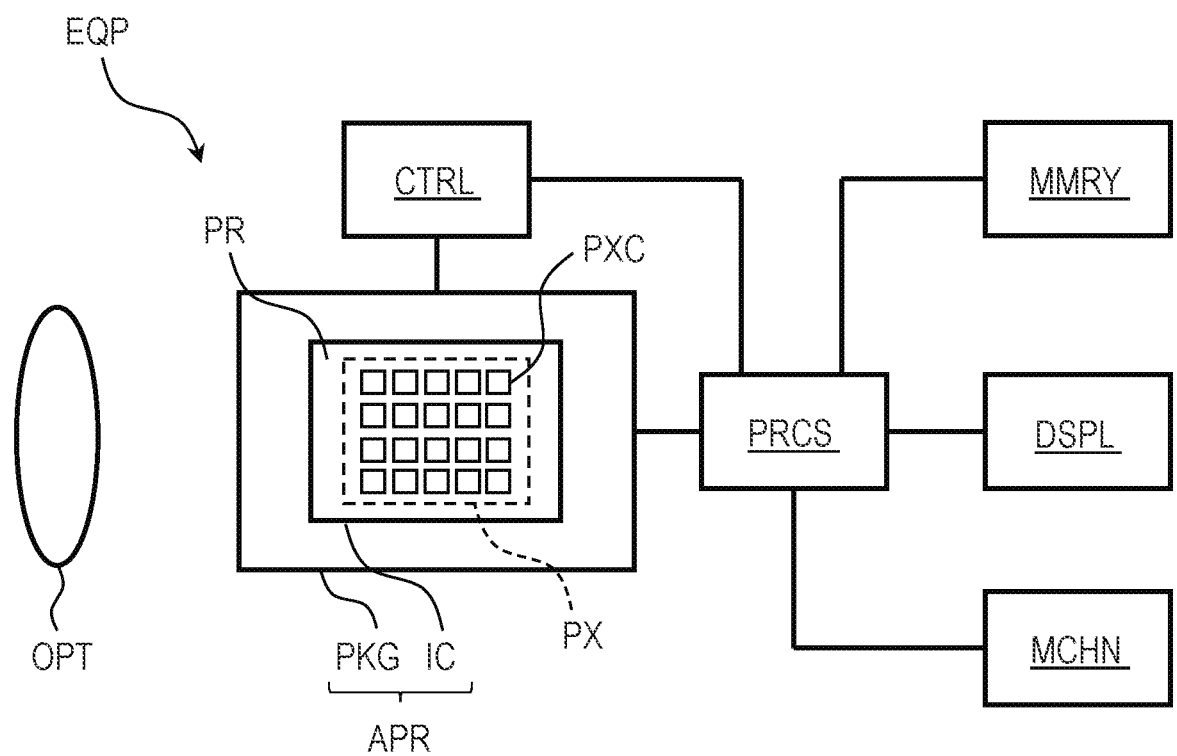
FIG. 14 is a block diagram illustrating a schematic configuration of equipment according to an eighth embodiment of the present invention.

Equipment according to an eighth embodiment of the present invention will be described with reference to FIG. 14. FIG. 14 is a block diagram illustrating a schematic configuration of equipment according to the present embodiment.

FIG. 14 is a schematic diagram illustrating equipment EQP including a photoelectric conversion device APR. The photoelectric conversion device APR has the function of the photoelectric conversion device 100 of any one of the first to fifth embodiments. All or a part of the photoelectric conversion device APR is a semiconductor device IC. The photoelectric conversion device APR of this example may be used, for example, as an image sensor, an AF (Auto Focus) sensor, a photometry sensor, or a distance measurement sensor. The semiconductor device IC includes a pixel area PX in which pixel circuits PXC including photoelectric conversion units are arranged in a matrix. The semiconductor device IC may include a peripheral area PR around the pixel area PX. Circuits other than the pixel circuits may be arranged in the peripheral area PR.

The photoelectric conversion device APR may have a structure (chip stacked structure) in which a first semiconductor chip provided with a plurality of photoelectric conversion units and a second semiconductor chip provided with peripheral circuits are stacked. Each peripheral circuit in the second semiconductor chip may be a column circuit corresponding to a pixel column of the first semiconductor chip. The peripheral circuits in the second semiconductor chip may be matrix circuits corresponding to the pixels or the pixel blocks of the first semiconductor chip. As a connection between the first semiconductor chip and the second semiconductor chip, a through electrode (TSV), an inter-chip interconnection by direct bonding of a conductor such as copper, a connection by micro bumps between chips, a connection by wire bonding, or the like may be adopted.

In addition to the semiconductor device IC, the photoelectric conversion device APR may include a package PKG that accommodates the semiconductor device IC. The package PKG may include a base body to which the semiconductor device IC is fixed, a lid body made of glass or the like facing the semiconductor device IC, and a connection member such as a bonding wire or a bump that connects terminals provided on the base body to terminals provided on the semiconductor device IC.

The equipment EQP may further comprise at least one of an optical device OPT, a control device CTRL, a processing device PRCS, a display device DSPL, a storage device MMRY, and a mechanical device MCHN. The optical device OPT corresponds to the photoelectric conversion device APR as a photoelectric conversion device, and is, for example, a lens, a shutter, or a mirror. The control device CTRL controls the photoelectric conversion device APR, and is, for example, a semiconductor device such as an ASIC. The processing device PRCS processes a signal output from the photoelectric conversion device APR, and constitutes an AFE (analog front end) or a DFE (digital front end). The processing unit PRCS is a semiconductor device such as a CPU (central processing unit) or an ASIC. The display device DSPL may be an EL display device or a liquid crystal display device which displays information (image) obtained by the photoelectric conversion device APR. The storage device MMRY may be a magnetic device or a semiconductor device that stores information (images) obtained by the photoelectric conversion device APR. The storage device MMRY may be a volatile memory such as an SRAM or a DRAM, or a nonvolatile memory such as a flash memory or a hard disk drive. The mechanical device MCHN includes a movable portion or a propulsion portion such as a motor or an engine. In the equipment EQP, a signal output from the photoelectric conversion device APR may be displayed on the display device DSPL, and is transmitted to the outside by a communication device (not illustrated) included in the equipment EQP. Therefore, it is preferable that the equipment EQP further include a storage device MMRY and a processing device PRCS separately from the storage circuit unit and the arithmetic circuit unit included in the photoelectric conversion device APR.

The equipment EQP illustrated in FIG. 14 may be an electronic device such as an information terminal (for example, a smartphone or a wearable terminal) having a photographing function or a camera (for example, an interchangeable lens camera, a compact camera, a video camera, and a surveillance camera.). The mechanical device MCHN in the camera may drive components of the optical device OPT for zooming, focusing, and shutter operation. The equipment EQP may be a transportation device (movable object) such as a vehicle, a ship, or an airplane. The equipment EQP may be a medical device such as an endoscope or a CT scanner.

The mechanical device MCHN in the transport device may be used as a mobile device. The equipment EQP as a transport device is suitable for transporting the photoelectric conversion device APR, or for assisting and/or automating operation (manipulation) by an imaging function. The processing device PRCS for assisting and/or automating operation (manipulation) may perform processing for operating the mechanical device MCHN as a mobile device based on information obtained by the photoelectric conversion device APR.

The photoelectric conversion device APR according to the present embodiment may provide the designer, the manufacturer, the seller, the purchaser, and/or the user with high value. Therefore, when the photoelectric conversion device APR is mounted on the equipment EQP, the value of the equipment EQP may be increased. Therefore, in order to increase the value of the equipment EQP, it is advantageous to determine the mounting of the photoelectric conversion device APR of the present embodiment on the equipment EQP when the equipment EQP is manufactured and sold.

Modified Embodiments

The present invention is not limited to the above-described embodiments, and various modifications are possible.

For example, an example in which some of the configurations of any of the embodiments are added to other embodiments or an example in which some of the configurations of any of the embodiments are substituted with some of the configurations of the other embodiments is also an embodiment of the present invention.

For example, although an example in which the phase difference detection function using dual pixels is applied to the configuration of the second embodiment is described in the third embodiment, the phase difference detection function using dual pixels may also be applied to other embodiments.

The imaging systems described in the sixth and seventh embodiments are examples of imaging systems to which the photoelectric conversion device according to the present invention may be applied, and imaging systems to which the photoelectric conversion device according to the present invention may be applied are not limited to the configurations illustrated in FIG. 12 and FIG. 13A.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-184522, filed Nov. 18, 2022 which is hereby incorporated by reference herein in its entirety.

What is claimed is:

1. A photoelectric conversion device comprising:
a plurality of pixels each including
   a photoelectric conversion unit configured to generate charge by photoelectric conversion,
   a first charge holding portion, a second charge holding portion, a third charge holding portion, and a fourth charge holding portion each configured to be transferred charge from the photoelectric conversion unit, and
   an output unit configured to output a signal corresponding to an amount of charge transferred from the first charge holding portion, the second charge holding portion, the third charge holding portion, or the fourth charge holding portion; and
a control circuit configured to control the plurality of pixels,
wherein the control circuit is configured to
   perform, during one frame, a transfer operation of transferring charge accumulated in the photoelectric conversion unit to one of the first charge holding portion and the second charge holding portion a plurality of times for each of the first charge holding portion and the second charge holding portion in each of the plurality of pixels at the same time, and
   perform, during the one frame, a readout operation of reading out from each of the plurality of pixels a signal corresponding to an amount of charge held in the third charge holding portion and a signal corresponding to an amount of charge held in the fourth charge holding portion.

2. The photoelectric conversion device according to claim 1,
wherein the charge held in the third charge holding portion in the one frame is charge transferred from the photoelectric conversion unit to the third charge holding portion by the plurality of times of the transfer operation in a frame preceding the one frame, and
wherein the charge held in the fourth charge holding portion in the one frame is charge transferred from the photoelectric conversion unit to the fourth charge holding portion by the plurality of times of the transfer operation in the frame preceding the one frame.

3. The photoelectric conversion device according to claim 2,
wherein the control circuit is configured to alternately perform
   a frame in which the plurality of times of the transfer operation of transferring charge from the photoelectric conversion unit to the first charge holding portion, the plurality of times of the transfer operation of transferring charge from the photoelectric conversion unit to the second charge holding portion, and the readout operation of reading out a signal corresponding to an amount of charge held in the third charge holding portion and a signal corresponding to an amount of charge held in the fourth charge holding portion from each of the plurality of pixels are performed, and
   a frame in which the plurality of times of the transfer operation of transferring charge from the photoelectric conversion unit to the third charge holding portion, the plurality of times of the transfer operation of transferring charge from the photoelectric conversion unit to the fourth charge holding portion, and the readout operation of reading out a signal corresponding to an amount of charge held in the first charge holding portion and a signal corresponding to an amount of charge held in the second charge holding portion from each of the plurality of pixels are performed.

4. The photoelectric conversion device according to claim 2,
wherein each of the plurality of pixels further includes
   a first transfer unit configured to transfer charge held in the photoelectric conversion unit to the first charge holding portion;
   a second transfer unit configured to transfer charge held in the photoelectric conversion unit to the second charge holding portion;
   a third transfer unit configured to transfer charge held in the photoelectric conversion unit to the third charge holding portion;
   a fourth transfer unit configured to transfer charge held in the photoelectric conversion unit to the fourth charge holding portion;
   a fifth transfer unit configured to transfer charge held in the first charge holding portion to the output unit;

a sixth transfer unit configured to transfer charge held in the second charge holding portion to the output unit;

a seventh transfer unit configured to transfer charge held in the third charge holding portion to the output unit; and an eighth transfer unit configured to transfer charge held in the fourth charge holding portion to the output unit, wherein the output unit includes a floating diffusion to be transferred charge from the first charge holding portion, the second charge holding portion, the third charge holding portion, or the fourth charge holding portion by the fifth transfer unit, the sixth transfer unit, the seventh transfer unit, or the eighth transfer unit.

5. The photoelectric conversion device according to claim 4, wherein the floating diffusion is individually provided for each of the fifth transfer unit, the sixth transfer unit, the seventh transfer unit, and the eighth transfer unit.

6. The photoelectric conversion device according to claim 1,
wherein the control circuit is further configured to perform
a transfer operation of transferring charge held in the first charge holding portion to the third charge holding portion after the plurality of times of the transfer operation from the photoelectric conversion unit to the first charge holding portion, and
a transfer operation of transferring charge held in the second charge holding portion to the fourth charge holding portion after the plurality of times of the transfer operation from the photoelectric conversion unit to the second charge holding portion.

7. The photoelectric conversion device according to claim 6,
wherein the charge held in the third charge holding portion in the one frame is charge transferred from the first charge holding portion to the third charge holding portion in a frame preceding the one frame, and
wherein the charge held in the fourth charge holding portion in the one frame is charge transferred from the second charge holding portion to the fourth charge holding portion in the frame preceding the one frame.

8. The photoelectric conversion device according to claim 6,
wherein each of the plurality of pixels further includes
a first transfer unit configured to transfer charge held in the photoelectric conversion unit to the first charge holding portion;
a second transfer unit configured to transfer charge held in the photoelectric conversion unit to the second charge holding portion;
a third transfer unit configured to transfer charge held in the first charge holding portion to the third charge holding portion;
a fourth transfer unit configured to transfer charge held in the second charge holding portion to the fourth charge holding portion;
a fifth transfer unit configured to transfer charge held in the third charge holding portion to the output unit; and
a sixth transfer unit configured to transfer charge held in the fourth charge holding portion to the output unit, and wherein the output unit includes a floating diffusion to be transferred charge from the third charge holding portion or the fourth charge holding portion by the fifth transfer unit or the sixth transfer unit.

9. The photoelectric conversion device according to claim 8, wherein the floating diffusion is individually provided for each of the third transfer unit and the fourth transfer unit.

10. The photoelectric conversion device according to claim 1, wherein the control circuit is configured to alternately perform the transfer operation from the photoelectric conversion unit to the first charge holding portion and the transfer operation from the photoelectric conversion unit to the second charge holding portion.

11. The photoelectric conversion device according to claim 1, wherein a total length of an accumulation period in the photoelectric conversion unit for accumulating charge to be transferred to the first charge holding portion by the plurality of times of the transfer operation is different from a total length of an accumulation period in the photoelectric conversion unit for accumulating charge to be transferred to the second charge holding portion by the plurality of times of the transfer operation.

12. The photoelectric conversion device according to claim 11, further comprising:
a signal processing unit configured to process signals output from the plurality of pixels,
wherein the signal processing unit is configured to generate a high dynamic range image by compositing a signal based on charge held in the first charge holding portions or the third charge holding portions of the plurality of pixels and a signal based on charge held in the second charge holding portions or the fourth charge holding portions of the plurality of pixels.

13. The photoelectric conversion device according to claim 1,
wherein each of the plurality of pixels includes
a first photoelectric conversion unit;
a second photoelectric conversion unit;
the first charge holding portion, the second charge holding portion, the third charge holding portion, and the fourth charge holding portion each provided corresponding to the first photoelectric conversion unit;
the first charge holding portion, the second charge holding portion, the third charge holding portion, and the fourth charge holding portion each provided corresponding to the second photoelectric conversion unit; and
a microlens, and
wherein the microlens is configured to collect light passed through a first pupil region among an exit pupil of an imaging lens in the first photoelectric conversion unit, and collect light passed through a second pupil region different from the first pupil region among the exit pupil in the second photoelectric conversion unit.

14. The photoelectric conversion device according to claim 1,
wherein each of the plurality of pixels further includes a fifth charge holding portion and a sixth charge holding portion each configured to be transferred charge from the photoelectric conversion unit,
wherein the control circuit is configured to
perform, during the one frame, a transfer operation of transferring the charge accumulated in the photoelectric conversion unit to one of the first charge holding portion, the second charge holding portion, and the fifth charge holding portion a plurality of times for each of the first charge holding portion, the second charge holding portion, and the fifth charge holding portion in each of the plurality of pixels at the same time, and perform, during the one frame, a readout operation of reading out from each of the plurality of pixels a signal corresponding to an amount of charge held in the third charge holding portion, a signal corresponding to an amount of charge held in the fourth charge holding portion, and a signal corresponding to an amount of charge held in the sixth charge holding portion.

15. The photoelectric conversion device according to claim 1, wherein each of the plurality of pixels further includes a reset unit connected to the photoelectric conversion unit, wherein an accumulation period of charge in the photoelectric conversion unit starts by a reset operation of the photoelectric conversion unit by the reset unit and ends by the transfer operation.

16. A method of driving a photoelectric conversion device including a plurality of pixels each including a photoelectric conversion unit configured to generate charge by photoelectric conversion; a first charge holding portion, a second charge holding portion, a third charge holding portion, and a fourth charge holding portion each configured to be transferred charge from the photoelectric conversion unit; and an output unit configured to output a signal corresponding to an amount of charge to be transferred from the first charge holding portion, the second charge holding portion, the third charge holding portion, or the fourth charge holding portion, the method comprising:

performing, during one frame, a transfer operation of transferring charge accumulated in the photoelectric conversion unit to one of the first charge holding portion and the second charge holding portion a plurality of times for each of the first charge holding portion and the second charge holding portion in each of the plurality of pixels at the same time; and performing, during the one frame, a readout operation of reading out from each of the plurality of pixels a signal corresponding to an amount of charge held in the third charge holding portion and a signal corresponding to an amount of charge held in the fourth charge holding portion.

17. An imaging system comprising:

the photoelectric conversion device according to claim 1; and a signal processing device configured to process a signal output from the photoelectric conversion device.

18. A movable object comprising:

the photoelectric conversion device according to claim 1; and a distance information acquisition unit configured to acquire distance information to an object from a parallax image based on a signal from the photoelectric conversion device; and a control unit configured to control the movable object based on the distance information.

19. Equipment comprising:

the photoelectric conversion device according to claim 1, and at least one of an optical device corresponding to the photoelectric conversion device, a control device configured to control the photoelectric conversion device, a processing device configured to process a signal output from the photoelectric conversion device, a mechanical device that is controlled based on information obtained by the photoelectric conversion device, a display device configured to display information obtained by the photoelectric conversion device, and a storage device configured to store information obtained by the photoelectric conversion device.

* * * * *